United States Patent
Yamasaki et al.

(10) Patent No.: US 7,143,593 B2
(45) Date of Patent: Dec. 5, 2006

(54) REFRIGERANT CYCLE APPARATUS

(75) Inventors: Haruhisa Yamasaki, Ora-gun (JP);
Masaji Yamanaka, Tatebayashi (JP);
Kenzo Matsumoto, Ora-gun (JP);
Shigeya Ishigaki, Ora-gun (JP);
Kazuaki Fujiwara, Ota (JP);
Tsunehisa Yumoto, Ashikaga (JP)

(73) Assignee: Sanyo Electric Co., Ltd., Osaka (JP)

( * ) Notice: Subject to any disclaimer, the term of this patent is extended or adjusted under 35 U.S.C. 154(b) by 291 days.

(21) Appl. No.: 10/773,448

(22) Filed: Feb. 9, 2004

(65) Prior Publication Data
US 2004/0216477 A1    Nov. 4, 2004

(30) Foreign Application Priority Data

| Mar. 24, 2003 | (JP) | ............................. 2003-079828 |
| Mar. 24, 2003 | (JP) | ............................. 2003-079852 |
| Mar. 24, 2003 | (JP) | ............................. 2003-080044 |
| Mar. 24, 2003 | (JP) | ............................. 2003-080060 |

(51) Int. Cl.
F25B 41/00 (2006.01)
F25B 49/00 (2006.01)
F25B 41/04 (2006.01)

(52) U.S. Cl. ........................... 62/216; 62/197; 62/199; 62/204

(58) Field of Classification Search ................ 62/216, 62/197, 199, 204
See application file for complete search history.

(56) References Cited

U.S. PATENT DOCUMENTS 4,563,879 A    1/1986    Hama et al.

6,006,544 A    12/1999    Watanabe et al.
6,519,958 B1    2/2003    Moon et al.
2002/0007943 A1    1/2002    Ozaki et al.

FOREIGN PATENT DOCUMENTS

| GB | 2 328 270 | 2/1999 |
| JP | 04203757 | 7/1992 |
| JP | 06050646 A  * | 2/1994 |
| JP | 06159817 | 6/1994 |
| JP | 7-18602 | 3/1995 |
| WO | WO 96/19704 | 6/1996 |

OTHER PUBLICATIONS

Partial European Search Report issued by European Patent Office on Jul. 28, 2004.

* cited by examiner

Primary Examiner—Chen Wen Jiang
(74) Attorney, Agent, or Firm—Westerman, Hattori, Daniels & Adrian, LLP.

(57) ABSTRACT

There is disclosed a refrigerant cycle apparatus capable of avoiding occurrence of an abnormal rise in a pressure on a high-pressure side in advance, comprising: a throttling mechanism including a first capillary tube, and a second capillary tube which is connected in parallel to the first capillary tube and whose flow path resistance is smaller than that of the first capillary tube; and a valve device for controlling refrigerant circulation into the first and second capillary tubes, so that a refrigerant is passed into the second capillary tube at the time of starting of a compressor.

6 Claims, 6 Drawing Sheets

A: TEMPERATURE IN CHAMBER IS 7°C OR MORE
    EVAPORATION TEMPERATURE: 0°C
    ROTATION NUMBER: 50~60Hz
  TEMPERATURE IN CHAMBER DROPS FROM 7°C
    EVAPORATION TEMPERATURE: -10°C
    ROTATION NUMBER: 30~50Hz
B: TEMPERATURE IN CHAMBER
    EVAPORATION TEMPERATURE: -10°C
    ROTATION NUMBER: 30~50Hz

REFRIGERANT CYCLE APPARATUS

BACKGROUND OF THE INVENTION

The present invention relates to a refrigerant cycle apparatus constituted by successively connecting a compressor, a gas cooler, throttling means and an evaporator.

In this type of conventional refrigerant cycle apparatus, a refrigerant cycle (refrigerant circuit) is constituted by successively piping and connecting a rotary compressor (compressor), a gas cooler, throttling means (expansion valve or the like), an evaporator and the like in an annular form. Further, a refrigerant gas is taken into a low-pressure chamber side of a cylinder from an intake port of a rotary compression element of the rotary compressor, and a refrigerant gas at a high temperature and a high pressure is obtained by compression performed by operations of a roller and a vane. This gas is then discharged to the gas cooler from a high-pressure chamber side through a discharge-port and a discharge sound absorbing chamber. The gas cooler releases heat from the refrigerant gas, then this gas is throttled by the throttling means and supplied to the evaporator. The refrigerant is evaporated in the evaporator, and a cooling effect is fulfilled by taking heat from the periphery at this time.

Here, in order to cope with global environment problems in recent years, there has been developed an apparatus which utilizes carbon dioxide ($CO_2$) that is a natural refrigerant even in this type of refrigerant cycle without using conventional fluorocarbon (see, e.g., Japanese Patent Publication No. 7-18602).

On the other hand, when the compressor is stopped after cooling the inside of a chamber in this refrigerant cycle apparatus, a liquid refrigerant is easily accumulated in the evaporator at a lowest temperature in the refrigerant circuit. Especially when the compressor is operated at a constant speed, and is started again in this case, liquid is returned to take the liquid refrigerant pooled in the evaporator into the compressor. There has been a possibility that the compressor compresses liquid and is damaged.

Therefore, in order to prevent the liquid refrigerant from returning into the compressor which results in the liquid compression, an accumulator is disposed between an outlet side of the evaporator and an intake side of the compressor, the liquid refrigerant is stored in this accumulator, and only the gas is taken into the compressor.

In the refrigerant cycle apparatus using carbon dioxide, since the high-pressure side becomes supercritical, the pressure does not become constant at outside air temperature, and rises to about 12 MPa. Especially, when the compressor is operated at a constant speed, the pressure on the high-pressure side further rises at the time of the starting of the compressor (pull-down time), exceeds a designed pressure of the apparatus, and has a possibility that the apparatus is damaged in a worst case. Therefore, a rotation number control (capacity control) of the compressor is executed by an inverter, or an opening of the expansion valve is adjusted, and accordingly a pressure rise on the high-pressure side needs to be reduced to start the compressor.

On the other hand, when an inexpensive capillary tube is used in the throttling means, in addition to the above-described abnormal rise of the pressure on the high-pressure side, there has been a problem of an increase of power consumption, because the rotation number of the compressor needs to be raised in order to lower an evaporation temperature of the refrigerant in the evaporator.

Moreover, when the refrigerant cycle apparatus is used as a cooling apparatus for cooling a refrigerator or a vending machine, a compression ratio of a carbon dioxide refrigerant becomes very high, and the temperature of the compressor or that of a refrigerant gas discharged in a refrigerant cycle becomes high. In this relation, it has been difficult to obtain a desired cooling capability (refrigerating capability) in the evaporator.

Furthermore, in the refrigerant cycle apparatus using carbon dioxide described above, since the high-pressure side becomes supercritical, the pressure on the high-pressure side rises regardless of the outside air temperature, and exceeds the designed pressure of the apparatus, and the apparatus is possibly damaged in the worst case. Therefore, the rotation number of the compressor is controlled, or a flow path resistance of the throttling means is adjusted, and accordingly the pressure on the high-pressure side has been controlled so as not to exceed the designed pressure of the apparatus.

On the other hand, when the accumulator is disposed on a low-pressure side of the refrigerant cycle, a larger filling amount of refrigerant is required. A problem has also occurred that an installation space is enlarged. Therefore, the rotation number control (capacity control) of the compressor is executed by the inverter, or the opening of the expansion valve is adjusted, and an amount of refrigerant taken into the compressor at the starting time is reduced in starting the compressor. Accordingly, an inconvenience that the liquid refrigerant is sucked into the compressor needs to be prevented.

SUMMARY OF THE INVENTION

The present invention has been developed to solve the above-described conventional technical problems, and an object thereof is to provide a refrigerant cycle apparatus capable of avoiding an abnormal rise in a pressure on a high-pressure side in advance.

Moreover, another object of the present invention is to provide a refrigerant cycle apparatus capable of avoiding the abnormal rise in the pressure on the high-pressure side in advance, while reducing power consumption and production cost.

Furthermore, further object of the present invention is to avoid the abnormal rise in the pressure on the high-pressure side in advance with a simple control mechanism and to improve a capability of a refrigerant cycle apparatus.

Additionally, still further object of the present invention is to provide a refrigerant cycle apparatus capable of avoiding a liquid return of a compressor in advance without disposing an accumulator on a low-pressure side.

That is, according to the present invention, there is provided a refrigerant cycle apparatus comprising: throttling means including a plurality of capillary tubes. Moreover, refrigerant circulation into each capillary tube is controlled so that a flow path resistance of the throttling means is variable, and the flow path resistance of the throttling means at the time of the starting of a compressor is reduced. For example, the throttling means comprises: a first capillary tube; and a second capillary tube which is connected in parallel to the first capillary tube and whose flow path resistance is smaller than that of the first capillary tube, a valve device for controlling the refrigerant circulation into each capillary tube is disposed, and the refrigerant is passed into the second capillary tube at the starting time of the compressor. Then, the flow path resistance at the starting time can be reduced.

Especially, when the valve device for controlling the refrigerant circulation into the second capillary tube is simply disposed, the flow path resistance at the starting time can be reduced, and therefore the production cost can be suppressed.

Moreover, for the refrigerant cycle apparatus of the present invention, in addition to the above-described invention, the flow path resistance of the throttling means is reduced or the refrigerant is passed into the second capillary tube for a predetermined time after the starting of the compressor.

Furthermore, for the refrigerant cycle apparatus of the present invention, in addition to the above-described invention, the flow path resistance of the throttling means is reduced or the refrigerant is passed into the second capillary tube from when the compressor is started until a temperature of the refrigerant in the refrigerant circuit reaches a predetermined value.

Additionally, for the refrigerant cycle apparatus of the present invention, in addition to the above-described invention, the flow path resistance of the throttling means is reduced or the refrigerant is passed into the second capillary tube from when the compressor is started until a temperature of a space to be cooled by the evaporator drops to a predetermined value.

Moreover, in addition to the above-described invention, since carbon dioxide is used as the refrigerant, the present invention is capable of contributing to environmental problems.

Especially when the compressor includes first and second compression elements driven by a driving element, the refrigerant is sucked into the first compression element from the low-pressure side of the refrigerant circuit and compressed, and the refrigerant discharged from the first compression element and having an intermediate pressure is sucked into the second compression element, compressed, and discharged to a gas cooler, the abnormal rise of the pressure at the starting time can effectively be eliminated.

Moreover, according to the present invention, there is provided a refrigerant cycle apparatus comprising: throttling means including a plurality of capillary tubes; and a control device for controlling refrigerant circulation into each capillary tube and a rotation number of a compressor. The control device controls the refrigerant circulation so that a flow path resistance of the throttling means is variable. The control device reduces the flow path resistance of the throttling means to increase the rotation number of the compressor, when a temperature detected by a sensor is not less than a predetermined value, and increases the flow path resistance of the throttling means to lower the rotation number of the compressor, when the temperature drops below a set value based on an output of the sensor for detecting the temperature of a space to be cooled substantially by an evaporator. For example, the throttling means comprises: a first capillary tube; and a second capillary tube which is connected in parallel to the first capillary tube and whose flow path resistance is smaller than that of the first capillary tube, and a valve device for controlling the refrigerant circulation into each capillary tube is disposed. The control device controls the valve device so as to pass the refrigerant into the second capillary tube, when the temperature detected by the sensor is not less than the predetermined value and to pass the refrigerant into the first capillary tube, when the temperature drops from the set value. Then, the flow path resistance is variable based on the temperature detected by the sensor.

Especially, when the valve device for controlling the refrigerant circulation into the second capillary tube is simply disposed, the flow path resistance is constituted to be variable, and therefore the production cost can be reduced.

Moreover, for the refrigerant cycle apparatus of the present invention, in addition to the above-described invention, since carbon dioxide is used as the refrigerant, the present invention is capable of contributing to the environmental problems.

Especially when the compressor includes first and second compression elements driven by a driving element, the refrigerant is sucked into the first compression element from the low-pressure side of the refrigerant circuit and compressed, and the refrigerant discharged from the first compression element and having an intermediate pressure is sucked into the second compression element, compressed, and discharged to a gas cooler, the abnormal rise of the pressure on a high-pressure side can effectively be eliminated.

Moreover, according to the present invention, there is provided a refrigerant cycle apparatus comprising: a control device for controlling a flow path resistance of throttling means and a rotation number of a compressor. The control device reduces the flow path resistance of the throttling means to raise the rotation number of the compressor, when a temperature detected by a sensor is not less than a defined temperature at any of +29° C. to +35° C., and increases the flow path resistance of the throttling means to lower the rotation number of the compressor, when the temperature detected by the sensor is lower than the defined temperature based on an output of the sensor for detecting the temperature of a space to be cooled by an evaporator. Therefore, the flow path resistance of the throttling means and the rotation number of the compressor can be controlled based on the temperature detected by the sensor.

Furthermore, according to the present invention, there is provided a refrigerant cycle apparatus comprising: a control device for controlling a flow path resistance of throttling means and a rotation number of a compressor; and an internal heat exchanger for exchanging heat between a refrigerant discharged from a gas cooler and a refrigerant discharged from an evaporator. The control device reduces the flow path resistance of the throttling means to raise the rotation number of the compressor, when a temperature detected by a sensor is not less than a defined temperature at any of +29° C. to +35° C., and increases the flow path resistance of the throttling means to lower the rotation number of the compressor, when the temperature detected by the sensor is lower than the defined temperature based on an output of the sensor for detecting the temperature of the refrigerant discharged from the internal heat exchanger via the evaporator. Therefore, the flow path resistance of the throttling means and the rotation number of the compressor can be controlled based on the temperature detected by the sensor.

Additionally, in the respective above-described inventions, when the temperature of a space to be cooled by the evaporator is set in a range of −2° C. to +7° C., an optimum control can be executed.

Moreover, the throttling means comprises: a first capillary tube; and a second capillary tube which is connected in parallel to the first capillary tube and whose flow path resistance is smaller than that of the first capillary tube, and the control device is connected to a valve device for controlling the refrigerant circulation into each capillary tube. The control device controls the valve device so as to pass the refrigerant into the second capillary tube, when the temperature detected by the sensor is not less than the defined temperature, and to pass the refrigerant into the first capillary tube, when the temperature is lower than the defined temperature. Then, the flow path resistance can be variable by use of the inexpensive capillary tubes.

Especially, when the valve device for controlling the refrigerant circulation into the second capillary tube is simply disposed, the flow path resistance can be variable, and therefore the production cost can be reduced.

Moreover, for the refrigerant cycle apparatus of the present invention, in addition to the above-described invention, since carbon dioxide is used as the refrigerant, the present invention is capable of contributing also to the environmental problems.

Especially when the compressor includes first and second compression elements driven by a driving element, the refrigerant is sucked into the first compression element from the low-pressure side of the refrigerant circuit and compressed, and the refrigerant discharged from the first compression element and having an intermediate pressure is sucked into the second compression element, compressed, and discharged to the gas cooler, the abnormal rise of the pressure on a high-pressure side can effectively be eliminated.

Moreover, according to the present invention, there is provided a refrigerant cycle apparatus comprising: throttling means including a plurality of capillary tubes. Moreover, refrigerant circulation into each capillary tube is controlled so that a flow path resistance of the throttling means is variable, and the flow path resistance of the throttling means at the time of the starting of a compressor is increased. For example, the throttling means comprises: a first capillary tube; and a second capillary tube which is connected in parallel to the first capillary tube and whose flow path resistance is smaller than that of the first capillary tube, a valve device for controlling the refrigerant circulation into each capillary tube is disposed, and the refrigerant is passed into the first capillary tube at the starting time of the compressor. Then, the flow path resistance at the starting time can be increased.

Especially, when the valve device for controlling the refrigerant circulation into the second capillary tube is simply disposed, the flow path resistance at the starting time can be increased, and therefore the production cost can be reduced.

Moreover, for the refrigerant cycle apparatus of the present invention, in addition to the above-described invention, the flow path resistance of the throttling means is increased or the refrigerant is passed into the first capillary tube for a predetermined time after the starting of the compressor.

Furthermore, for the refrigerant cycle apparatus of the present invention, in addition to the above-described invention, the flow path resistance of the throttling means is increased or the refrigerant is passed into the first capillary tube from when the compressor is started until a temperature of the refrigerant in the refrigerant circuit reaches a predetermined value.

Additionally, for the refrigerant cycle apparatus of the present invention, in addition to the above-described invention, the flow path resistance of the throttling means is increased or the refrigerant is passed into the first capillary tube from when the compressor is started until a temperature of a space to be cooled by the evaporator drops to a predetermined value.

Moreover, in addition to the above-described invention, since carbon dioxide is used as the refrigerant, the present invention is capable of contributing also to the environmental problems.

Especially, when the compressor includes first and second compression elements driven by a driving element, the refrigerant is sucked into the first compression element from the low-pressure side of the refrigerant circuit and compressed, and the refrigerant discharged from the first compression element and having an intermediate pressure is sucked into the second compression element, compressed, and discharged to a gas cooler, liquid return can effectively eliminated to prevent a liquid refrigerant from being sucked into the compressor at the starting time.

DETAILED DESCRIPTION OF THE PREFERRED EMBODIMENT

Figure 1:
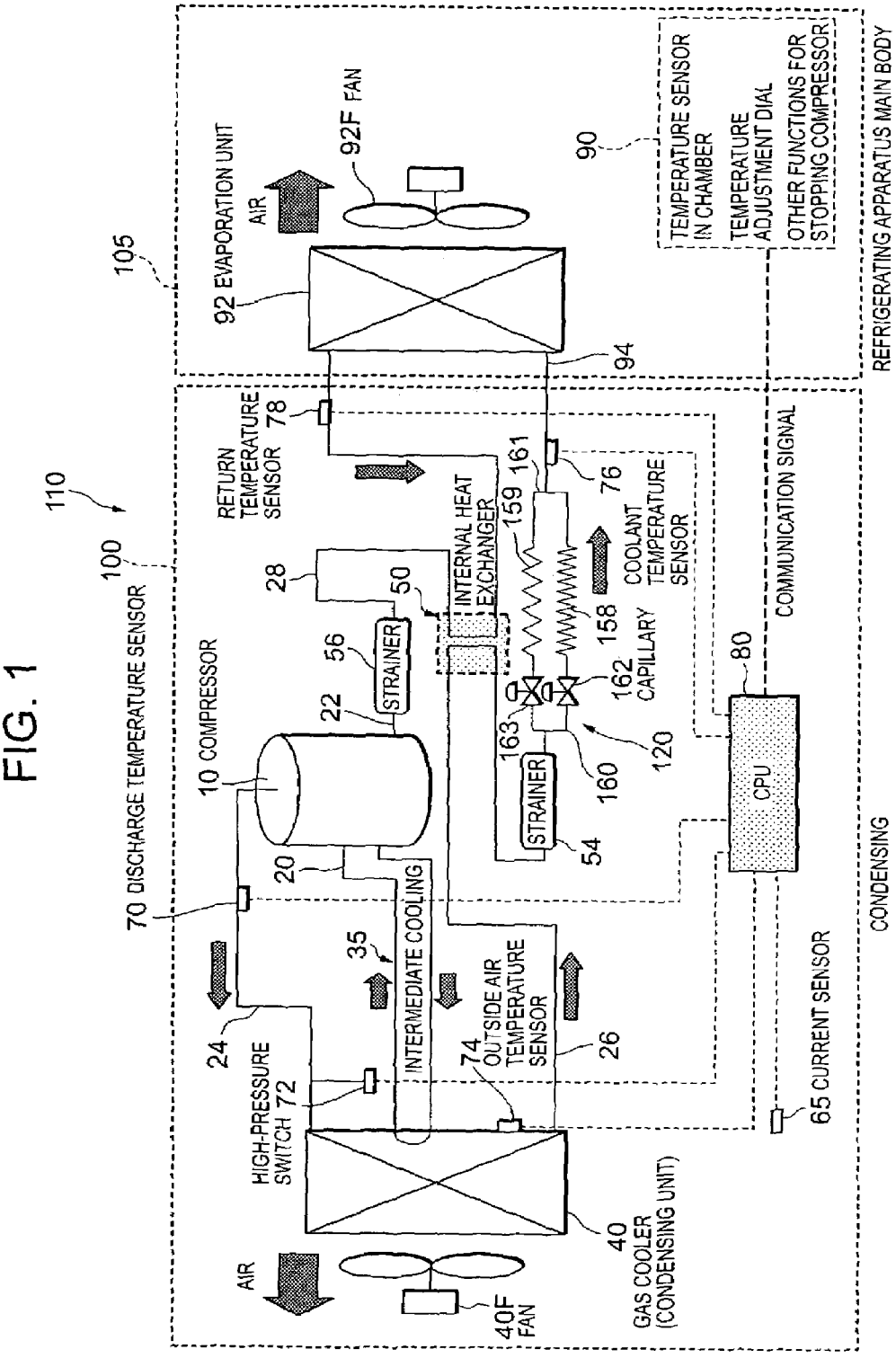
FIG. 1 is a refrigerant circuit diagram of a refrigerant cycle apparatus of the present invention.

Next, embodiments of the present invention will be described in detail with reference to the accompanying drawings. FIG. 1 is a refrigerant circuit diagram of a refrigerant cycle apparatus 110 to which the present invention is applied. The refrigerant cycle apparatus 110 of the present embodiment is, for example, a showcase installed in a store. The refrigerant cycle apparatus 110 is constituted of a condensing unit 100 and a refrigerating apparatus main body 105 constituting a cooling apparatus main body. Therefore, the refrigerating apparatus main body 105 is a main body of the showcase.

The condensing unit 100 includes a compressor 10, gas cooler (condenser) 40, and a throttling mechanism 120 described later as throttling means, and is connected to an evaporator 92 of the refrigerating apparatus main body 105 described later via a piping, and the compressor 10, gas cooler 40, and throttling mechanism 120 constitute a predetermined refrigerant circuit together with the evaporator 92.

That is, a refrigerant discharge tube 24 of the compressor 10 is connected to an inlet of the gas cooler 40. Here, the compressor 10 of the present embodiment is an internal intermediate pressure type multistage (two-stage) compressive rotary compressor which uses carbon dioxide ($CO_2$) as a refrigerant. The compressor 10 is constituted of an electric element which is a driving element in a sealed container (not shown), and a first rotary compression element (first compression element) and a second rotary compression element (second compression element) which are driven by the electric element.

A reference numeral 20 denotes a refrigerant introducing tube for once discharging the refrigerant compressed by the first rotary compression element (first stage) of the compressor 10 and discharged into the sealed container to the outside to introduce the refrigerant into the second rotary compression element (second stage). One end of the refrigerant introducing tube 20 communicates with a cylinder of the second rotary compression element (not shown). The other end of the refrigerant introducing tube 20 enters the sealed container via an intermediate cooling circuit 35 disposed in the gas cooler 40 as described later in detail.

A reference numeral 22 denotes a refrigerant introducing tube for introducing the refrigerant into the cylinder of the first rotary compression element (not shown) of the compressor 10. One end of the refrigerant introducing tube 22 communicates with the cylinder of the first rotary compression element (not shown). The refrigerant introducing tube 22 is connected to one end of a strainer 56. The strainer 56 catches and filters foreign matters such as dust and cut chips mixed in a refrigerant gas circulating in the refrigerant circuit, and is constituted of an opening formed in the other end of the strainer 56 and a filter (not shown) having a substantially conical shape tapered toward one end of the strainer 56 from the opening. The opening of the filter is attached to a refrigerant piping 28 connected to the other end of the strainer 56 in a close fit state.

Moreover, the refrigerant discharge tube 24 is a refrigerant piping for discharging the refrigerant compressed by the second rotary compression element to the gas cooler 40.

An outside air temperature sensor 74 for detecting an outside air is disposed in the gas cooler 40, and is connected to a microcomputer 80 (control device) described later as control means of the condensing unit 100.

A refrigerant piping 26 passes through an internal heat exchanger 50 from the gas cooler 40. The internal heat exchanger 50 exchanges heat between the refrigerant discharged from the gas cooler 40 on a high-pressure side from the second rotary compression element and the refrigerant discharged from the evaporator 92 disposed in the refrigerating apparatus main body 105 on a low-pressure side.

Figure 2:
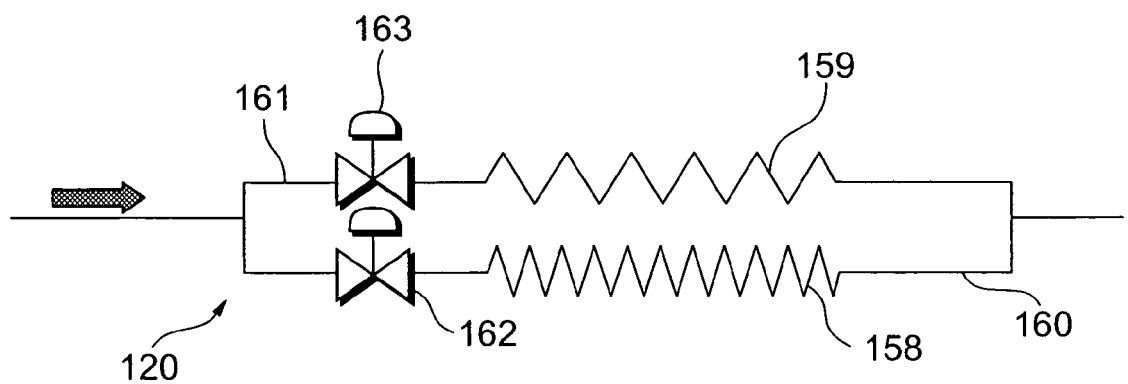
FIG. 2 is an enlarged view of a throttling mechanism of an embodiment.

Moreover, the refrigerant piping 26 on the high-pressure side passed through the internal heat exchanger 50 extends to the throttling mechanism 120 via a strainer 54 similar to the above-described strainer. Here, the throttling mechanism 120 is constituted of a plurality of capillary tubes, and controls refrigerant circulation into each capillary tube so that a flow path resistance into the throttling mechanism 120 is variable. That is, as shown in FIG. 2, the throttling mechanism 120 of the embodiment is constituted of a first capillary tube 158, and a second capillary tube 159 connected in parallel to the first capillary tube 158 and having a flow path resistance smaller than that of the first capillary tube 158. A valve device 162 for controlling the refrigerant circulation into the first capillary tube 158 is disposed in a refrigerant piping 160 in which the first capillary tube 158 is disposed, and is connected to the microcomputer 80 of the condensing unit 100.

Similarly, a valve device 163 for controlling the refrigerant circulation into the second capillary tube 159 is disposed in a refrigerant piping 161 in which the second capillary tube 159 is disposed, and is connected to the microcomputer 80 of the condensing unit 100.

Moreover, the microcomputer 80 controls opening/closing of the valve devices 162, 163 based on a predetermined signal from a control device 90 of the refrigerating apparatus main body 105 described later.

Furthermore, one end of a refrigerant piping 94 of the refrigerating apparatus main body 105 is detachably connected to the refrigerant piping 26 of the condensing unit 100 via a swage lock joint (not shown).

On the other hand, the refrigerant piping 28 connected to the other end of the strainer 56 is detachably connected to the other end of the refrigerant piping 28 of the refrigerating apparatus main body 105 via the internal heat exchanger 50 via a swage lock joint similar to the above-described joint.

A discharge temperature sensor 70 for detecting the temperature of a refrigerant gas discharged from the compressor 10, and a high-pressure switch 72 for detecting the pressure of the refrigerant gas are disposed on the refrigerant discharge tube 24, and are connected to the microcomputer 80.

A refrigerant temperature sensor 76 for detecting the temperature of the refrigerant discharged from the throttling mechanism 120 is disposed on the refrigerant piping 26 extended from the throttling mechanism 120, and is also connected to the microcomputer 80. A return temperature sensor 78 for detecting the temperature of the refrigerant discharged from the evaporator 92 of the refrigerating apparatus main body 105 is disposed on an inlet side of the internal heat exchanger 50 of the refrigerant piping 28 connected to the swage lock joint of the refrigerating apparatus main body 105. The return temperature sensor 78 is also connected to the microcomputer 80.

It is to be noted that a reference numeral 40F denotes a fan for ventilating the gas cooler 40 to cool the air, and 92F denotes a fan for circulating cool air which has exchanged heat with the evaporator 92 disposed in a duct (not shown) of the refrigerating apparatus main body 105 in a chamber of the refrigerating apparatus main body 105. A reference numeral 65 denotes a current sensor for detecting a current supplied to the above-described electric element of the compressor 10 to control operation. The fan 40F and the current sensor 65 are connected to the microcomputer 80 of the condensing unit 100, and the fan 92F is connected to the control device 90 of the refrigerating apparatus main body 105 described later.

Here, the microcomputer 80 is a control device for controlling the condensing unit 100, and inputs of the microcomputer 80 are connected to signals from the discharge temperature sensor 70, high-pressure switch 72, outside air temperature sensor 74, refrigerant temperature sensor 76, return temperature sensor 78, current sensor 65, and control device 90 of the refrigerating apparatus main body 105. Moreover, the compressor 10 or the fan 40F connected to an output is controlled based on the inputs. Furthermore, the microcomputer 80 controls the opening/closing of the valve devices 162 and 163 in response to a communication signal from the control device 90 of the refrigerating apparatus main body 105.

A temperature sensor in chamber (not shown) for detecting a temperature in chamber, temperature adjustment dial for adjusting the temperature in chamber, and other functions for stopping the compressor 10 are disposed in the control device 90 of the refrigerating apparatus main body 105. Moreover, the control device 90 controls the fan 92F based on these outputs. Furthermore, the control device 90 sends a predetermined signal to the microcomputer 80, when the temperature in chamber is not more than a set value.

That is, when the temperature in chamber of the refrigerating apparatus main body 105 detected by the temperature sensor in chamber is not more than the set value, the control device 90 sends a predetermined signal to the microcomputer 80. The microcomputer 80 opens the valve device 162, and closes the valve device 163 to open a flow path of the refrigerant piping 160. Accordingly, the refrigerant from the strainer 54 flows into the first capillary tube 158.

As the refrigerant of the refrigerant cycle apparatus 110, the above-described carbon dioxide ($CO_2$) which is friendly to the global environment and which is a natural refrigerant is used in view of combustibility, toxicity, and the like. As an oil which is a lubricant, existing oils are used such as a mineral oil, an alkyl benzene oil, an ether oil, an ester oil, and polyalkylene blycol (PAG). It is to be noted that carbon dioxide is used as the refrigerant in the present embodiment, but the present invention is effective, even when the other refrigerants such as nitrous oxide and HC-based refrigerant are used.

Moreover, the refrigerating apparatus main body 105 is constituted of the evaporator 92 and the refrigerant piping 94 extending in the evaporator 92. The refrigerant piping 94 passes in the evaporator 92 in a meandering manner, and a fin for heat exchange is attached to a meandering portion to constitute the evaporator 92. Opposite ends of the refrigerant piping 94 are detachably connected to the swage lock joint (not shown).

Next, an operation of the refrigerant cycle apparatus 110 will be described. A start switch (not shown) disposed in the refrigerating apparatus main body 105 is turned on, or a power socket of the refrigerating apparatus main body 105 is connected to an electrical outlet. Then, the microcomputer 80 closes the valve device 162, opens the valve device 163, opens the flow path of the refrigerant piping 161, and starts the electric element (not shown) of the compressor 10. Accordingly, the refrigerant is sucked into the first rotary compression element of the compressor 10 and compressed, and the refrigerant gas discharged into the sealed container enters the refrigerant introducing tube 20 and flows into the intermediate cooling circuit 35 from the compressor 10. Moreover, in the intermediate cooling circuit 35, the heat is released from the refrigerant passed through the gas cooler 40 by an air cooling method.

Accordingly, since the refrigerant sucked into the second rotary compression element can be cooled, a temperature rise in the sealed container is suppressed, and compression efficiency in the second rotary compression element can be enhanced. It is also possible to suppress the temperature rise of the refrigerant which has been compressed by the second rotary compression element and discharged.

Moreover, the cooled refrigerant gas having an intermediate pressure is sucked into the second rotary compression element of the compressor 10, and compressed in the second stage to constitute the refrigerant gas having a high pressure at a high temperature, and the gas is discharged to the outside via the refrigerant discharge tube 24. The refrigerant gas discharged from the refrigerant discharge tube 24 flows into the gas cooler 40, the heat is released by the air cooling method, and thereafter the gas passes the internal heat exchanger 50. The heat of the refrigerant is taken by the refrigerant on the low-pressure side, and is further cooled.

Since the heat of the refrigerant passed through the internal heat exchanger 50 from the gas cooler 40 is taken by the refrigerant on the low-pressure side by the presence of the internal heat exchanger 50, a supercooling degree of the refrigerant increases. Therefore, the cooling capability in the evaporator 92 is improved.

The refrigerant gas on the high-pressure side cooled by the internal heat exchanger 50 flows into the refrigerant piping 161 via the strainer 54 and valve device 163, and reaches the second capillary tube 159. The pressure of the refrigerant drops in the second capillary tube 159, and the refrigerant flows into the evaporator 92 from the refrigerant piping 94 of the refrigerating apparatus main body 105 via the swage lock joint (not shown) connecting the refrigerant piping 26 to one end of the refrigerant piping 94 of the refrigerating apparatus main body 105. Here, the refrigerant evaporates, takes the heat from the surrounding air to fulfill a cooling function, and cools the inside of the chamber of the refrigerating apparatus main body 105.

Here, as described above, at the starting time, since the microcomputer 80 opens the flow path of the refrigerant piping 161, the refrigerant from the strainer 54 flows into the second capillary tube 159 whose flow path resistance is smaller than that of the first capillary tube 158. The pressure on the high-pressure side easily rises at the starting time. When the pressure is reduced in the first capillary tube 158 having a large flow path resistance, the refrigerant on the high-pressure side does not easily flows. Furthermore, the pressure on the high-pressure side rises and exceeds a designed pressure of the apparatus. In a worst case, there is a possibility that a problem of damage on the apparatus is caused.

However, since the pressure of the refrigerant is reduced in the second capillary tube 159, the flow path resistance of the refrigerant on the high-pressure side is reduced as compared with the reduction of the pressure in the first capillary tube 158. Therefore, the abnormal rise of the pressure on the high-pressure side can be prevented, and the damage of the apparatus can be avoided beforehand.

Accordingly, since stable operation can be carried out at the starting time of the compressor 10, reliability of the refrigerant cycle apparatus 110 can be improved.

Moreover, the refrigerant flows out of the evaporator 92, and reaches the internal heat exchanger 50 of the condensing unit 100 via the swage lock joint (not shown) connecting the other end of the refrigerant piping 94 to the refrigerant piping 28 of the condensing unit 100. Then, the refrigerant takes the heat from that on the high-pressure side as described above, and undergoes a heating function. Here, the refrigerant evaporates in the evaporator 92 at the low temperature. The refrigerant discharged from the evaporator 92 is not completely brought into a gas state, and a liquid mixed state is attained in some case. However, the refrigerant is passed through the internal heat exchanger 50 to exchange the heat with the high-temperature refrigerant on the high-pressure side, and is accordingly heated. At this time, the refrigerant secures a degree of superheat, and completely turns to the gas.

Accordingly, since the refrigerant discharged from the evaporator 92 can securely be gasified, the liquid return is securely prevented to prevent the liquid refrigerant from being sucked into the compressor 10 without disposing any accumulator on the low-pressure side, and it is possible to avoid an inconvenience that the compressor 10 is damaged by the liquid compression. Therefore, the reliability of the refrigerant cycle apparatus 110 can be enhanced.

It is to be noted that a cycle is repeated in which the refrigerant heated in the internal heat exchanger 50 is sucked into the first rotary compression element of the compressor 10 from the refrigerant introducing tube 22 via the strainer 56.

Here, when the temperature in chamber of the refrigerating apparatus main body 105 drops to be not more than the set value, the control device 90 of the refrigerating apparatus main body 105 converts the output from the temperature sensor in chamber into the predetermined communication signal, and sends the signal to the microcomputer 80. Upon receiving the signal, the microcomputer 80 opens the valve device 162, closes the valve device 163, and opens the flow path of the refrigerant piping 160. Accordingly, the refrigerant from the strainer 54 flows into the refrigerant piping 160, and the pressure of the refrigerant is reduced in the first capillary tube 158.

That is, when the refrigerant circulates to a certain degree after the starting of the compressor 10, the states of the apparatus and refrigerant in the refrigerant circuit are stabilized, and the temperature in chamber of the refrigerating apparatus main body 105 drops. Then, when the temperature in chamber of the refrigerating apparatus main body 105 drops below the set value, the control device 90 sends the predetermined signal to the microcomputer 80. The microcomputer 80 which has received the signal opens the valve device 162, closes the valve device 163, and opens the flow path of the refrigerant piping 160 so as to reduce the pressure of the refrigerant in the first capillary tube 158 having a large flow path resistance. Accordingly, the pressure of the refrigerant from the strainer 54 is reduced in the first capillary tube 158.

Accordingly, when the pressure is reduced in the first capillary tube 158 having a large flow path resistance, the refrigerant evaporates in a lower temperature range in the evaporator 92 of the refrigerating apparatus main body 105, and therefore the temperature in chamber can be cooled at a predetermined low temperature.

When the temperature in chamber of the refrigerating apparatus main body 105 is higher than the set value in this manner, the pressure of the refrigerant from the strainer 54 is reduced in the second capillary tube 159 having a small flow path resistance. Accordingly, the abnormal rise of the pressure on the high-pressure side can be avoided in advance. Moreover, since an amount of circulating refrigerant increases, the cooling capability (refrigerating capability) is enhanced.

Accordingly, since an unstable operation situation of the compressor 10 at the starting time can be avoided, durability of the refrigerant cycle apparatus 110 can be enhanced.

Furthermore, when the temperature in chamber of the refrigerating apparatus main body 105 drops to be not more than the set value, the refrigerant reduced in pressure by the first capillary tube 158 having the large flow path resistance flows into the evaporator 92. Therefore, the evaporation of the refrigerant occurs in a lower temperature region, and the temperature in chamber can be cooled at the predetermined low temperature.

Moreover, instead of controlling the rotation number of the compressor by an inverter (capacity control) or adjusting the opening of an expansion valve as in the related art, the abnormal rise of the pressure on the high-pressure side can be prevented only by the capillary tubes 158, 159 and the valve devices 162, 163 for controlling the opening/closing of the tubes, and therefore the production cost can be reduced.

It is to be noted that in the refrigerant cycle apparatus of the present embodiment, the valve devices 162, 163 are opened/closed based on the temperature in chamber of the refrigerating apparatus main body 105 detected by the temperature sensor in chamber connected to the control device 90 of the refrigerating apparatus main body 105. However, the present invention is not limited to this. The microcomputer 80 may control the valve devices 162, 163 based on the refrigerant temperature in another position in the refrigerant circuit, for example, the refrigerant temperature detected by the return temperature sensor 78 connected to the microcomputer 80 of the condensing unit 100.

Furthermore, the present invention is effective in that the valve device 162 is opened and the valve device 163 is closed with elapse of a predetermined time after the starting of the compressor 10 regardless of the refrigerant temperature in the refrigerant circuit.

Figure 3:
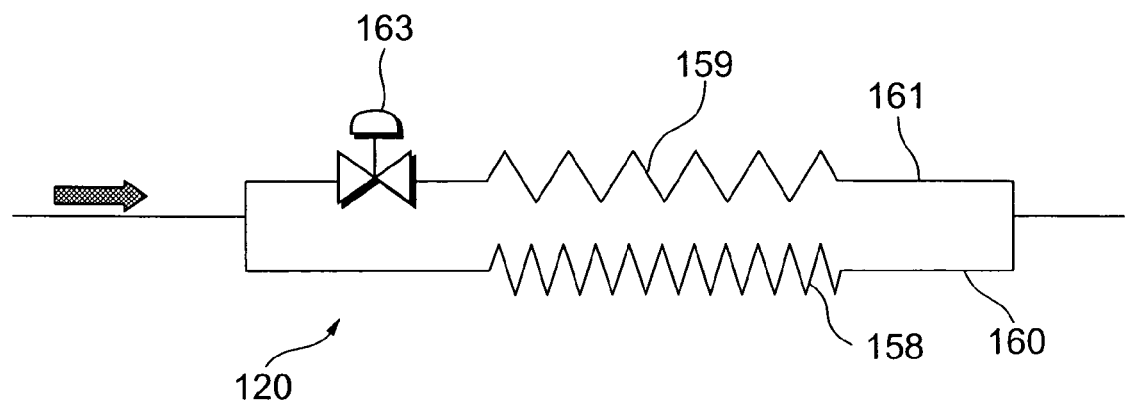
FIG. 3 is an enlarged view of the throttling mechanism of another embodiment.

Moreover, the valve devices for the flow path control are disposed both in the refrigerant piping 160 including the first capillary tube 158 and the refrigerant piping 161 including the second capillary tube 159. However, as shown in FIG. 3, the valve device may be disposed only in the refrigerant piping 161 in which the second capillary tube 159 having a small flow path resistance is disposed. In this case, the valve device 163 is opened to open the flow path of the refrigerant piping 161 at the starting time, and accordingly the refrigerant from the strainer 54 flows into the refrigerant piping 161 having a small resistance. Therefore, in addition to the effect of the embodiment, when the valve device 163 is simply disposed, the flow path resistance at the starting time can be reduced, and the production cost can further be reduced.

Moreover, in the present embodiment, the first capillary tube 158 and the second capillary tube 159 are disposed in the refrigerant piping 160 and the refrigerant piping 161, respectively, these tubes are connected in parallel, and the flow path is controlled by the valve devices 162, 163. However, the present invention is not limited to this. Three or more capillary tubes may also be disposed to allow the refrigerant to flow into each capillary tube in accordance with the operation situation in some case. Alternatively, two or more capillary tubes may be connected in series. In this case, a bypass piping is disposed via which one or more capillary tubes among the tubes are bypassed, the valve device is disposed in the bypass piping, and some of the tubes may also be bypassed in accordance with the operation situation.

As described above in detail, in the refrigerant cycle apparatus of the present invention, the throttling means is constituted of a plurality of capillary tubes. Moreover, the refrigerant circulation into each capillary tube is controlled so that the flow path resistance of the throttling means is variable. The flow path resistance of the throttling means at the starting time of the compressor is reduced. For example, the throttling means is constituted of the first capillary tube, and the second capillary tube connected in parallel to the first capillary tube and having a flow path resistance smaller than that of the first capillary tube, the valve device is disposed to control the refrigerant circulation into each capillary tube, and the refrigerant is allowed to flow, for example, into the second capillary tube at the starting time of the compressor. Then, the flow path resistance at the starting time can be reduced.

Accordingly, a disadvantage that the pressure on the high-pressure side abnormally rises at the starting time is avoided in advance, the durability is enhanced, and smooth operation can be secured.

Moreover, when the flow path resistance is increased at a normal operation time other than the starting time, the refrigerant evaporates in a lower temperature region, and therefore the temperature in chamber can be cooled at the predetermined low temperature. Accordingly, the capability of the refrigerant cycle apparatus can be enhanced.

Furthermore, without controlling the rotation number of the compressor by the inverter (capacity control) or adjusting the opening of the expansion valve as in the related art, the abnormal rise of the pressure on the high-pressure side can be prevented only by a plurality of inexpensive capillary tubes, and the production cost can be reduced.

Especially, when the valve device for controlling the refrigerant circulation into the second capillary tube is simply disposed, the flow path resistance at the starting time is variable, and the production cost can be reduced.

Furthermore, the present invention is suitable for an apparatus using carbon dioxide which brings the pressure on the high-pressure side into a supercritical state. Moreover, when the carbon dioxide refrigerant is used as the refrigerant, the present invention can also contribute to the environmental problems.

Especially, when the compressor includes the first and second compression elements driven by the driving element, the refrigerant is sucked into the first compression element from the low-pressure side of the refrigerant circuit and compressed, and the refrigerant discharged from the first compression element and having the intermediate pressure is sucked into the second compression element, compressed, and discharged to the gas cooler, the abnormal rise of the pressure at the starting time can effectively be eliminated.

Figure 4:
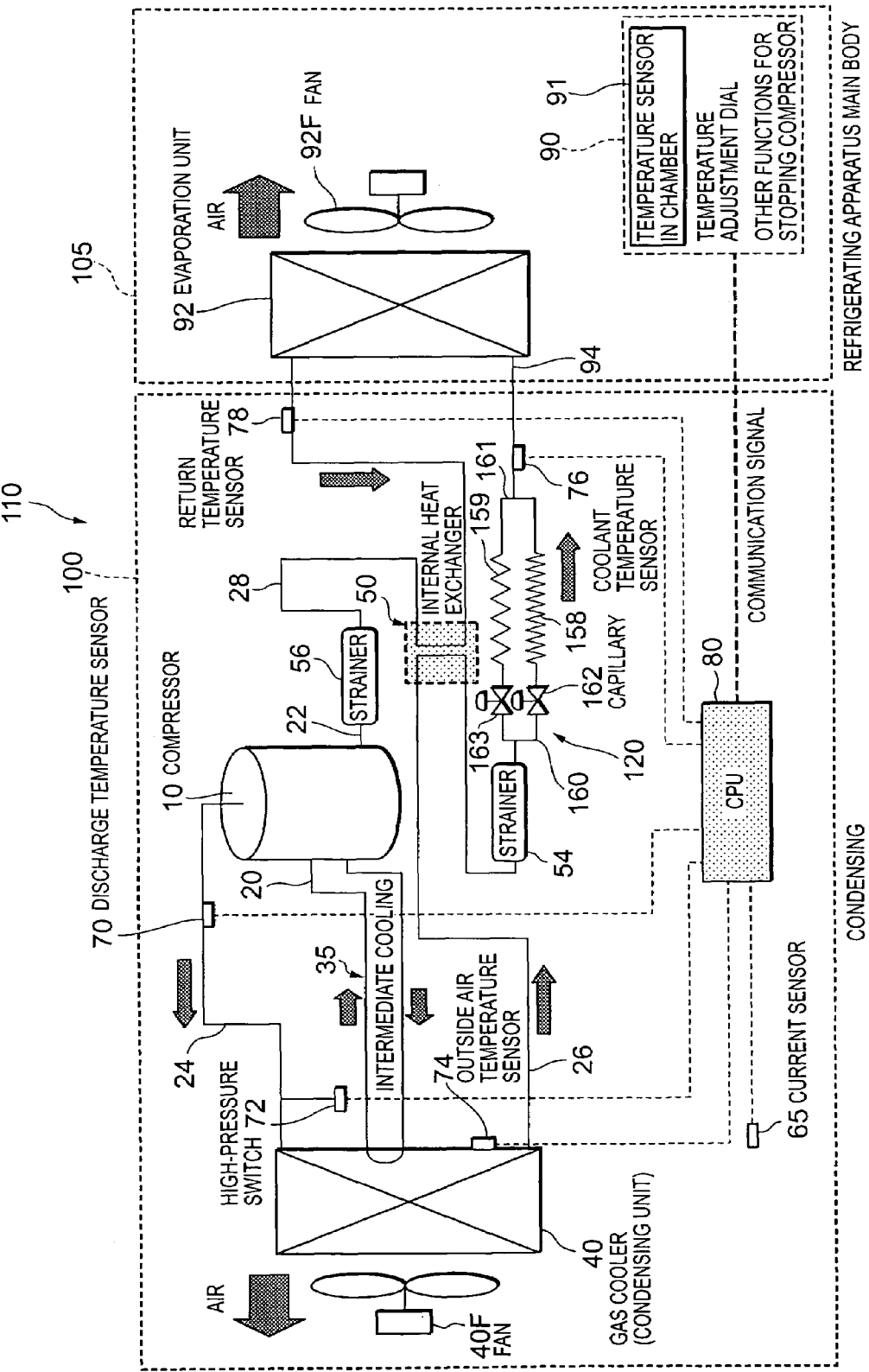
FIG. 4 is a refrigerant circuit diagram of another refrigerant cycle apparatus of the present invention.

Next, another invention will be described with reference to FIG. 4. FIG. 4 shows another refrigerant circuit diagram of the refrigerant cycle apparatus of the present invention. It is to be noted that in this figure, the same reference numerals as those in FIG. 1 denote identical or similar functions/structures, and the description thereof is omitted here. This also applies to the refrigerant or oil for use.

In this case, the electric element of the compressor 10 is a direct winding type DC motor, and the rotation number and torque are controlled by the inverter. Moreover, in the same manner as described above, the microcomputer 80 is the control device for controlling the condensing unit 100, and the inputs of the microcomputer 80 are connected to the signals from the discharge temperature sensor 70, high-pressure switch 72, outside air temperature sensor 74, refrigerant temperature sensor 76, return temperature sensor 78, current sensor 65, and control device 90 of the refrigerating apparatus main body 105. Moreover, the compressor 10 or the fan 40F connected to the output is controlled based on the inputs in such a manner that the temperature in chamber of the refrigerating apparatus main body 105 is in a range of −2° C. to +5° C. Furthermore, the microcomputer 80 controls the opening/closing of the valve devices 162 and 163 in response to the predetermined communication signal from the control device 90 of the refrigerating apparatus main body 105. The microcomputer 80 also controls the rotation number of the compressor 10 based on the signal from the control device 90 in addition to the inputs from the discharge temperature sensor 70, high-pressure switch 72, outside air temperature sensor 74, refrigerant temperature sensor 76, return temperature sensor 78, and current sensor 65.

A temperature sensor in chamber 91 for detecting the temperature in the space to be cooled by the 92 or the temperature in chamber in the embodiment, the temperature adjustment dial for adjusting the temperature in chamber, and the other functions for stopping the compressor 10 are disposed in the control device 90 of the refrigerating apparatus main body 105. Moreover, the control device 90 controls the fan 92F based on these outputs so that the temperature in chamber is in a range of −2° C. to +5° C. Furthermore, the control device 90 sends the predetermined signal to the microcomputer 80, when the temperature in chamber detected by the temperature sensor in chamber 91 drops below the set value.

That is, when the temperature in chamber of the refrigerating apparatus main body 105 detected by the temperature sensor in chamber 91 is the set value at +7° C. or more, the microcomputer 80 executes a control to close the valve device 162 and to open the valve device 163 and to open the flow path of the refrigerant piping 161. Accordingly, the refrigerant from the strainer 54 flows into the second capillary tube 159. At this time, the microcomputer 80 controls the rotation number of the compressor 10 for the operation of the compressor 10 in a rotation number range of 50 to 60 Hz.

Moreover, when the temperature in chamber detected by the temperature sensor in chamber 91 drops below +7° C., the control device 90 sends the predetermined signal to the microcomputer 80. Accordingly, the microcomputer 80 opens the valve device 162, closes the valve device 163, and opens the flow path of the refrigerant piping 161. Then, the refrigerant from the strainer 54 flows into the first capillary tube 158, and the flow path resistance of the throttling mechanism 120 increases. Furthermore, the microcomputer 80 lowers the rotation number of the compressor 10 by the signal from the control device 90 to control the rotation number so that the compressor 10 operates at 50 Hz or less, in a range of 30 to 50 Hz in the present embodiment.

Next, the operation of the refrigerant cycle apparatus 110 in this case will be described. The start switch (not shown) disposed in the refrigerating apparatus main body 105 is turned on, or the power socket of the refrigerating apparatus main body 105 is connected to the electrical outlet. Then, the microcomputer 80 starts the electric element (not shown) of the compressor 10 via the inverter. At this time, when the temperature in chamber of the refrigerating apparatus main body 105 detected by the temperature sensor in chamber 91 is +7° C. or more, the microcomputer 80 closes the valve device 162, opens the valve device 163, opens the flow path of the refrigerant piping 161, and controls the rotation number of the compressor so as to operate the compressor 10 in the rotation number range of 50 to 60 Hz based on the signal from the control device 90. Accordingly, the refrigerant is sucked into the first rotary compression element of the compressor 10 and compressed, and the refrigerant gas discharged into the sealed container enters the refrigerant introducing tube 20 and flows into the intermediate cooling circuit 35 from the compressor 10. Moreover, in the intermediate cooling circuit 35, the heat is released from the refrigerant passed through the gas cooler 40 by the air cooling method.

Accordingly, since the refrigerant sucked into the second rotary compression element can be cooled, the temperature rise in the sealed container is suppressed, and the compression efficiency in the second rotary compression element can be enhanced. It is also possible to suppress the temperature rise of the refrigerant which has been compressed by the second rotary compression element and discharged.

Moreover, the cooled refrigerant gas having the intermediate pressure is sucked into the second rotary compression element of the compressor 10, and compressed in the second stage to constitute the refrigerant gas having the high pressure at the high temperature, and the gas is discharged to the outside via the refrigerant discharge tube 24. The refrigerant gas discharged from the refrigerant discharge tube 24 flows into the gas cooler 40, the heat is released by the air cooling method, and thereafter the gas passes the internal heat exchanger 50. The heat of the refrigerant is taken by the refrigerant on the low-pressure side, and is further cooled.

Since the heat of the refrigerant passed through the internal heat exchanger 50 from the gas cooler 40 is taken by the refrigerant on the low-pressure side by the presence of the internal heat exchanger 50, the supercooling degree of the refrigerant increases. Therefore, the cooling capability in the evaporator 92 is improved.

The refrigerant gas on the high-pressure side cooled by the internal heat exchanger 50 flows into the refrigerant piping 161 via the strainer 54 and valve device 163, and reaches the second capillary tube 159. The pressure of the refrigerant drops in the second capillary tube 159, and the refrigerant flows into the evaporator 92 from the refrigerant piping 94 of the refrigerating apparatus main body 105 via the swage lock joint (not shown) connecting the refrigerant piping 26 to one end of the refrigerant piping 94 of the refrigerating apparatus main body 105. Here, the refrigerant evaporates, takes the heat from the surrounding air to fulfill the cooling function, and cools the inside of the chamber of the refrigerating apparatus main body 105.

Here, as described above, when the temperature in chamber of the refrigerating apparatus main body 105 detected by the temperature sensor in chamber 91 is +7° C. or more, the microcomputer 80 opens the flow path of the refrigerant piping 161, and the refrigerant from the strainer 54 flows into the second capillary tube 159 whose flow path resistance is smaller than that of the first capillary tube 158. When the temperature in chamber of the refrigerating apparatus main body 105 is +7° C. or more, the inside of the chamber of the refrigerating apparatus main body 105 is desired to be cooled in early stages. That is, the pressure is reduced in the second capillary tube 159 having a small flow path resistance, moreover the compressor 10 is operated with a comparatively high rotation number in a rotation number range of 50 to 60 Hz, and accordingly the amount of refrigerant circulating in the refrigerant circuit increases. Accordingly, since the amount of the refrigerant flowing into the evaporator 92 increases, the cooling capability (refrigerating capability) in the evaporator 92 is improved.

Figure 5:
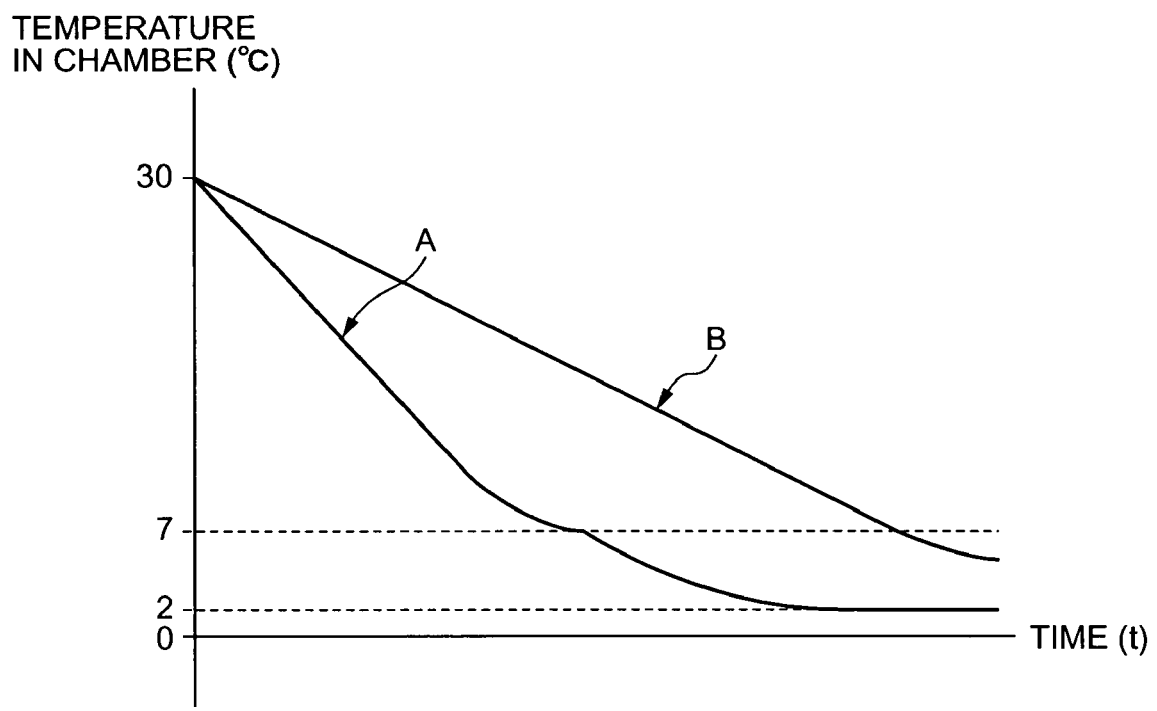
FIG. 5 is a diagram showing transition of a temperature in chamber.

This state will be described with reference to FIG. 5. FIG. 5 is a diagram showing transition of the temperature in chamber of the refrigerating apparatus main body 105. Line A shows the transition of the temperature in chamber, when the present invention is applied. Line B shows the transition of a conventional temperature in chamber. With the use of only the capillary tube 158 having the large flow path resistance as in the related art, when the temperature in chamber is high, an evaporation temperature in the evaporator 92 is low at −10° C. However, since the amount of the refrigerant flowing into the evaporator 92 is small, the inside of the chamber of the refrigerating apparatus main body 105 is not easily cooled as shown by the line B of FIG. 5.

However, in the present invention, two capillary tubes 158, 159 different from each other in the flow path resistance are used. When the temperature in chamber is high, the second capillary tube 159 having the small flow path resistance is used, and therefore the evaporation temperature in the evaporator 92 is at 0° C. This temperature is higher as compared with the reduction of the pressure in the first capillary tube 158. However, since more refrigerant flows into the evaporator 92, the inside of the chamber of the refrigerating apparatus main body 105 can be cooled in the early stages as shown by the line A of FIG. 5.

On the other hand, when the temperature in chamber of the refrigerating apparatus main body 105 detected by the temperature sensor in chamber 91 drops below +7° C., the control device 90 sends the predetermined signal to the microcomputer 80. Accordingly, the microcomputer 80 opens the valve device 162, closes the valve device 163, and opens the flow path of the refrigerant piping 160. Furthermore, the microcomputer 80 controls the rotation number of the compressor 10 in such a manner that the rotation number lowers and the compressor 10 operates in a range of 30 to 50 Hz. Accordingly, the refrigerant from the strainer 54 flows into the first capillary tube 158 having the large flow path resistance. When the temperature in chamber of the refrigerating apparatus main body 105 is cooled to the certain degree, and drops below +7° C., the inside of the chamber of the refrigerating apparatus main body 105 is desired to be at the desired temperature (−2° C. to +5° C. in the embodiment). That is, when the pressure is reduced by the first capillary tube 158 having the large flow path resistance, the refrigerant evaporates in a lower temperature region in the evaporator 92 of the refrigerating apparatus main body 105. Therefore, the temperature in chamber can be cooled at the predetermined low temperature (−2° C. to +5° C.).

At this time, when the rotation number of the compressor 10 is controlled so as to operate the compressor in a comparatively high rotation number range of 50 to 60 Hz, the pressure of the high-pressure refrigerant from the strainer 54 is reduced in the first capillary tube 158 large in flow path resistance. Therefore, although the refrigerant on the high-pressure side does not easily flow, much refrigerant is compressed by the compressor 10. Therefore, the pressure on the high-pressure side abnormally rises and exceeds the designed pressure of the apparatus, and in the worst case, there is a possibility that the problem of the damage on the apparatus is caused.

Therefore, when the microcomputer 80 lowers and controls the rotation number of the compressor 10 so as to operate the compressor in a range of 30 to 50 Hz, the abnormal rise of the pressure on the high-pressure side can be prevented, and the damage on the apparatus can be avoided in advance.

On the other hand, the inside of the chamber of the refrigerating apparatus main body 105 is in a cooled state to a certain degree. Therefore, even when the rotation number of the compressor 10 is lowered, and the cooling capability drops, there is no problem. When the rotation number of the compressor 10 is lowered to operate the apparatus, the power consumption can be reduced.

On the other hand, when the temperature in chamber of the refrigerating apparatus main body 105 detected by the temperature sensor in chamber 91 is +7° C. or more, the control device 90 sends the predetermined signal to the microcomputer 80, and the microcomputer 80 closes the valve device 162 and opens the valve device 163 to open the flow path of the refrigerant piping 161. Furthermore, the microcomputer 80 controls the rotation number of the compressor 10 in such a manner that the rotation number lowers and the compressor 10 operates in a range of 50 to 60 Hz.

Accordingly, since the amount of refrigerant circulating in the refrigerant cycle increases as described above, more refrigerant flows into the evaporator 92, the cooling capability in the evaporator 92 is therefore enhanced, and the temperature in chamber of the refrigerating apparatus main body 105 can be lowered in the early stages.

Moreover, the refrigerant flows out of the evaporator 92, and reaches the internal heat exchanger 50 of the condensing unit 100 via the swage lock joint (not shown) connecting the other end of the refrigerant piping 94 to the refrigerant piping 28 of the condensing unit 100. Then, the refrigerant takes the heat from the refrigerant on the high-pressure side, and undergoes the heating function. Here, the refrigerant evaporates in the evaporator 92 at the low temperature. The refrigerant discharged from the evaporator 92 is not completely brought into the gas state, and the liquid mixed state is attained in some case. However, the refrigerant is passed through the internal heat exchanger 50 to exchange the heat with the high-temperature refrigerant on the high-pressure side, and is accordingly heated. At this time, the refrigerant secures the degree of superheat, and completely turns to the gas.

Accordingly, since the refrigerant discharged from the evaporator 92 can securely be gasified, the liquid return is securely prevented to prevent the liquid refrigerant from being sucked into the compressor 10 without disposing any accumulator on the low-pressure side, and it is possible to avoid the inconvenience that the compressor 10 is damaged by the liquid compression. Therefore, the reliability of the refrigerant cycle apparatus 110 can be enhanced.

It is to be noted that the cycle is repeated in which the refrigerant heated in the internal heat exchanger 50 is sucked into the first rotary compression element of the compressor 10 from the refrigerant introducing tube 22 via the strainer 56.

Here, when the temperature in chamber of the refrigerating apparatus main body 105 detected by the temperature sensor in chamber 91 is higher than the set value, the pressure of the refrigerant from the strainer 54 is reduced in the second capillary tube 159 smaller in flow path resistance. Moreover, the rotation number of the compressor 10 is raised and controlled so as to operate the compressor 10 in a range of 50 to 60 Hz, and the refrigerant circulating amount in the refrigerant circuit increases. Accordingly, since the amount of refrigerant flowing in the evaporator 92 increases, the cooling capability (refrigerating capability) is enhanced. Therefore, the inside of the chamber of the refrigerating apparatus main body 105 can be cooled in the early stages.

On the other hand, when the temperature in chamber of the refrigerating apparatus main body 105 drops below the set value, the pressure is reduced in the first capillary tube 158 large in flow path resistance. Moreover, the rotation number of the compressor 10 is lowered and controlled so as to operate the compressor 10 in a range of 30 to 50 Hz, and the abnormal rise of the pressure on the high-pressure side can be avoided. Since the refrigerant evaporates in the lower temperature region in the evaporator 92, the temperature in chamber can be cooled at the predetermined low temperature. Furthermore, when the rotation number of the compressor 10 is lowered to operate the compressor, the power consumption can be reduced.

Moreover, the throttling mechanism can be constituted of the inexpensive capillary tubes 158, 159 without using any electrical or mechanical expansion valve in the throttling means to adjust the opening of the valve as in the related art, and therefore the production cost can be reduced.

Accordingly, while avoiding an unstable operation situation of the compressor 10, the reduction of the production cost and the enhancement of the capability can be realized with respect to the refrigerant cycle apparatus 110.

It is to be noted that in the refrigerant cycle apparatus of the present embodiment, the valve devices 162, 163 are opened/closed and the rotation number of the compressor 10 is controlled based on the temperature of the space to be cooled by the evaporator 92, which is the output of the temperature sensor in chamber 91 for detecting the temperature in chamber of the refrigerating apparatus main body 105. However, the present invention is not limited to the temperature in chamber. As long as the temperature of the space to be cooled by the evaporator 92 can substantially be detected, the control may also be executed, for example, based on a sensor for detecting the evaporation temperature of the evaporator 92 or a sensor for detecting the temperature in the path for passing the cool air which has exchanged the heat with the evaporator 92.

Moreover, the valve devices for the flow path control are disposed both in the refrigerant piping 160 including the first capillary tube 158 and the refrigerant piping 161 including the second capillary tube 159. However, as shown in FIG. 3, the valve device may be disposed only in the refrigerant piping 161 in which the second capillary tube 159 small in flow path resistance is disposed. In this case, when the temperature in chamber is 7° C. or more, the valve device 163 is opened to open the flow path of the refrigerant piping 161, and accordingly the refrigerant from the strainer 54 flows into the refrigerant piping 161 small in resistance. Therefore, in addition to the effect of the above-described embodiment, when the valve device 163 is simply disposed, the flow path resistance can be varied, and the production cost can further be reduced.

Figure 6:
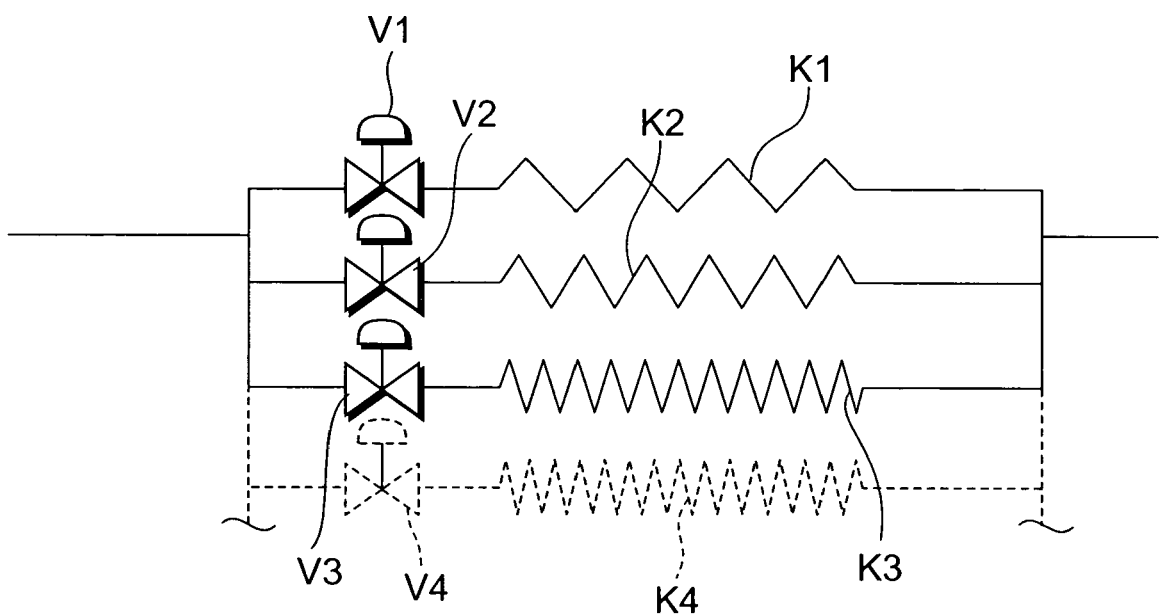
FIG. 6 is an enlarged view of the throttling mechanism of still another embodiment.

Moreover, in the present embodiment, the first capillary tube 158 and the second capillary tube 159 are disposed in the refrigerant piping 160 and the refrigerant piping 161, respectively, these tubes are connected in parallel, and the flow path is controlled by the valve devices 162, 163. However, the present invention is not limited to this. Three or more capillary tubes may also be disposed to allow the refrigerant to flow into each capillary tube in accordance with the operation situation as shown in FIG. 6. In this case, finer control can be carried out. It is to be noted that in FIG. 6, K1 to K4 denote the capillary tubes, and V1 to V4 denote the valve devices for controlling the refrigerant circulation into the capillary tubes K1 to K4.

Furthermore, two or more capillary tubes are connected in series. In this case, the bypass piping is disposed via which one or more capillary tubes among the tubes are bypassed, the valve device is disposed in the bypass piping, and some of the tubes may also be bypassed in accordance with the operation situation.

As described above in detail, in the refrigerant cycle apparatus of the present invention, the throttling means is constituted of a plurality of capillary tubes. Moreover, the control device is disposed to control the refrigerant circulation into each capillary tube and the rotation number of the compressor. The refrigerant circulation is controlled by the control device so that the flow path resistance of the throttling means is variable. The control device reduces the flow path resistance of the throttling means to raise the rotation number of the compressor, when the temperature detected by the sensor is not less than the predetermined value, and increases the flow path resistance of the throttling means to lower the rotation number of the compressor, when the temperature drops below the set value based on the output of the sensor for detecting the temperature of the space to be cooled substantially by the evaporator. For example, the throttling means is constituted of the first capillary tube, and the second capillary tube connected in parallel to the first capillary tube and having a flow path resistance smaller than that of the first capillary tube, and the valve device is disposed to control the refrigerant circulation into each capillary tube. The control device controls the valve device so as to pass the refrigerant into the second capillary tube, when the temperature detected by the sensor is not less than the predetermined value and to pass the refrigerant into the first capillary tube, when the temperature drops below the set value. Then, the flow path resistance can be varied based on the temperature detected by the sensor.

Accordingly, the disadvantage that the pressure on the high-pressure side abnormally rises is avoided in advance, the durability is enhanced, and the smooth operation can be secured.

Moreover, when the temperature detected by the sensor is not less than the predetermined value, the flow path resistance of the throttling means is decreased to raise the rotation number of the compressor, and accordingly the refrigerant circulating amount in the refrigerant circuit increases. Therefore, since the amount of refrigerant flowing into the evaporator increases, the cooling capability (refrigerating capability) is enhanced, and the space to be cooled can be cooled in the early stages.

On the other hand, when the temperature detected by the sensor drops, the flow path resistance of the throttling means is increased to lower the rotation number of the compressor, and therefore the abnormal rise of the pressure on the high-pressure side can be avoided.

Moreover, since the refrigerant evaporates in the lower temperature region in the evaporator, the space to be cooled can be cooled at the predetermined low temperature. Furthermore, when the rotation number of the compressor is lowered, the power consumption can be reduced.

The pressure reduction means can be constituted of a plurality of inexpensive capillary tubes without using any electrical or mechanical expansion valve to adjust the opening of the valve as in the related art, and therefore the production cost can be reduced.

Especially when the valve device for controlling the refrigerant circulation into the second capillary tube is simply disposed, the flow path resistance can be varied, and the production cost can be reduced.

Furthermore, the present invention is suitable for the apparatus using carbon dioxide whose pressure on the high-pressure side is supercritical as the refrigerant. Moreover, when the carbon dioxide refrigerant is used as the refrigerant, the present invention is also capable of contributing to the environmental problems.

Especially, when the compressor includes the first and second compression elements driven by the driving element, the refrigerant is sucked into the first compression element from the low-pressure side of the refrigerant circuit and compressed, and the refrigerant discharged from the first compression element and having the intermediate pressure is sucked into the second compression element, compressed, and discharged to the gas cooler, the abnormal rise of the pressure on the high-pressure side can effectively be eliminated.

Next, still another invention will be described. It is to be noted that in this case, the refrigerant circuit of the refrigerant cycle apparatus is similar to that of FIG. 4. Also in this case, the electric element of the compressor 10 is the direct winding type DC motor, and the rotation number and the torque are controlled by the inverter.

Furthermore, in this case, when the temperature in chamber detected by the temperature sensor in chamber 91 is lower than any defined temperature of +29° C. to +35° C. (+32° C. in the embodiment), the control device 90 sends the predetermined signal to the microcomputer 80.

That is, when the temperature in chamber of the refrigerating apparatus main body 105 detected by the temperature sensor in chamber 91 is not less than +32° C., the microcomputer 80 closes the valve device 162 and opens the valve device 163 to open the flow path of the refrigerant piping 161. The refrigerant from the strainer 54 is controlled to flow into the second capillary tube 159, and the flow path resistance of the throttling mechanism 120 is reduced. At this time, the microcomputer 80 controls the rotation number of the compressor 10 so as to operate the compressor 10 in a rotation number range of 50 to 60 Hz.

Moreover, when the temperature in chamber detected by the temperature sensor in chamber 91 drops below +32° C., the control device 90 sends the predetermined signal to the microcomputer 80, and accordingly the microcomputer 80 opens the valve device 162 and closes the valve device 163 to open the flow path of the refrigerant piping 161. Accordingly, the refrigerant from the strainer 54 flows into the first capillary tube 158, and the flow path resistance of the throttling mechanism 120 increases. Furthermore, the microcomputer 80 controls the rotation number of the compressor 10 in response to the signal from the control device 90 in such a manner that the rotation number lowers and the compressor 10 operates in a rotation number range of 50 Hz or less, for example, 30 to 50 Hz.

Next, the operation of the refrigerant cycle apparatus 110 in this case will be described. The start switch (not shown) disposed in the refrigerating apparatus main body 105 is turned on, or the power socket of the refrigerating apparatus main body 105 is connected to the electrical outlet. Then, the microcomputer 80 starts the electric element (not shown) of the compressor 10 via the inverter. At this time, when the temperature in chamber of the refrigerating apparatus main body 105 detected by the temperature sensor in chamber 91 is +32° C. or more, the microcomputer 80 closes the valve device 162, opens the valve device 163, opens the flow path of the refrigerant piping 161, and controls the rotation number of the compressor so as to operate the compressor 10 in a rotation number range of 50 to 60 Hz based on the signal from the control device 90. Accordingly, the refrigerant is sucked into the first rotary compression element of the compressor 10 and compressed, and the refrigerant gas discharged into the sealed container enters the refrigerant introducing tube 20 and flows into the intermediate cooling circuit 35 from the compressor 10. Moreover, in the intermediate cooling circuit 35, the heat is released from the refrigerant passed through the gas cooler 40 by the air cooling method.

Accordingly, since the refrigerant sucked into the second rotary compression element can be cooled, the temperature rise in the sealed container is suppressed, and the compression efficiency in the second rotary compression element can be enhanced. It is also possible to suppress the temperature rise of the refrigerant which has been compressed by the second rotary compression element and discharged.

Moreover, the cooled refrigerant gas having the intermediate pressure is sucked into the second rotary compression element of the compressor 10, and compressed in the second stage to constitute the refrigerant gas having the high pressure at the high temperature, and the gas is discharged to the outside via the refrigerant discharge tube 24. The refrigerant gas discharged from the refrigerant discharge tube 24 flows into the gas cooler 40, the heat is released by the air cooling method, and thereafter the gas passes the internal heat exchanger 50. The heat of the refrigerant is taken by the refrigerant on the low-pressure side, and is further cooled.

Since the heat of the refrigerant passed through the internal heat exchanger 50 from the gas cooler 40 is taken by the refrigerant on the low-pressure side by the presence of the internal heat exchanger 50, the supercooling degree of the refrigerant increases. Therefore, the cooling capability (refrigerating capability) in the evaporator 92 is improved.

The refrigerant gas on the high-pressure side cooled by the internal heat exchanger 50 flows into the refrigerant piping 161 via the strainer 54 and valve device 163, and reaches the second capillary tube 159. The pressure of the refrigerant drops in the second capillary tube 159, and the refrigerant flows into the evaporator 92 from the refrigerant piping 94 of the refrigerating apparatus main body 105 via the swage lock joint (not shown) connecting the refrigerant piping 26 to one end of the refrigerant piping 94 of the refrigerating apparatus main body 105. Here, the refrigerant evaporates, takes the heat from the surrounding air to fulfill the cooling function, and cools the inside of the chamber of the refrigerating apparatus main body 105.

Here, as described above, when the temperature in chamber of the refrigerating apparatus main body 105 detected by the temperature sensor in chamber 91 is +32° C. or more, the microcomputer 80 opens the flow path of the refrigerant piping 161, and therefore the refrigerant from the strainer 54 flows into the second capillary tube 159 having a flow path resistance smaller than that of the first capillary tube 158.

On the other hand, when the temperature in chamber of the refrigerating apparatus main body 105 detected by the temperature sensor in chamber 91 drops below +32° C., the control device 90 sends the predetermined signal to the microcomputer 80. Accordingly, the microcomputer 80 opens the valve device 162 and closes the valve device 163 to open the flow path of the refrigerant piping 160. Furthermore, the microcomputer 80 controls the rotation number of the compressor 10 in such a manner that the rotation number lowers and the compressor operates in a range of 30 to 50 Hz. Accordingly, the refrigerant from the strainer 54 flows into the first capillary tube 158 large in the flow path resistance.

Figure 7:
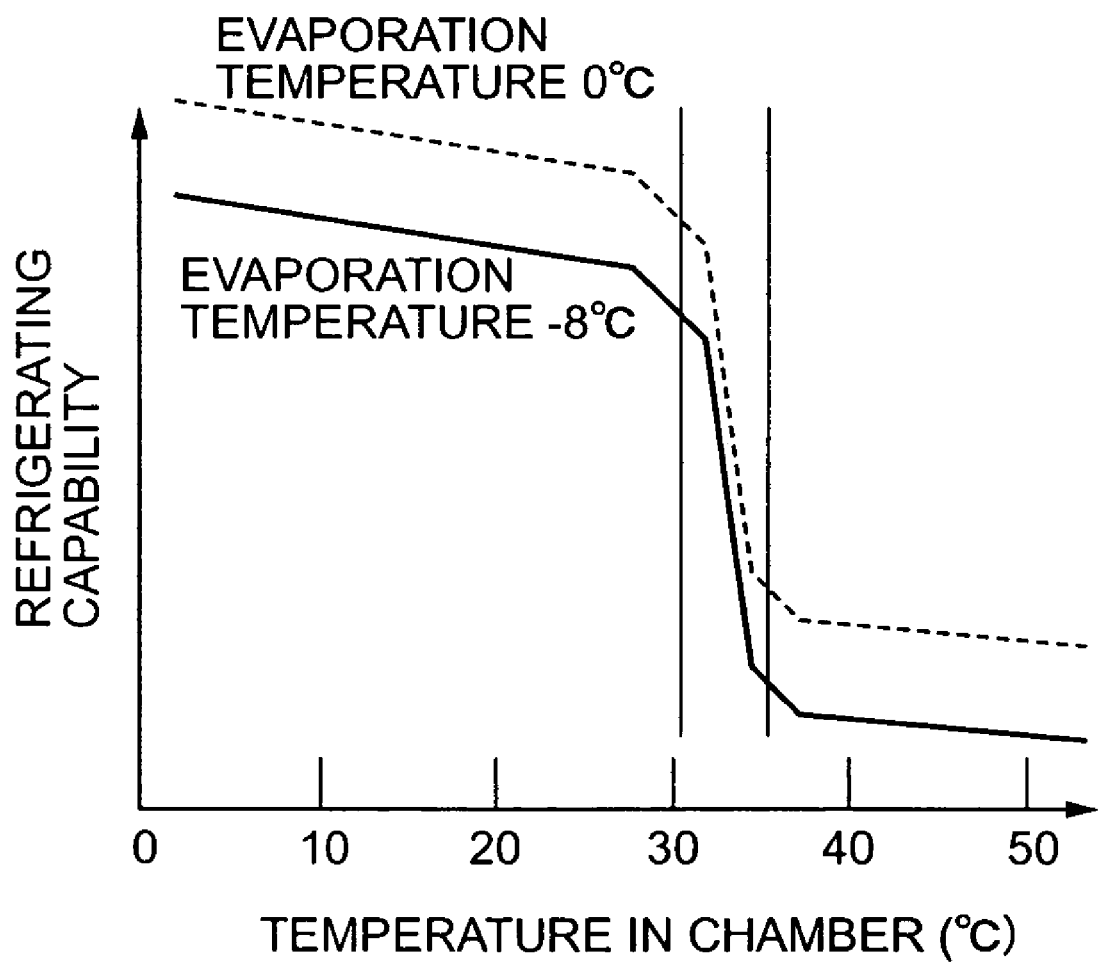
FIG. 7 is a diagram showing a relation between a temperature in chamber and a cooling capability (refrigerating capability).

This state will be described with reference to FIG. 7. FIG. 7 is a diagram showing a relation between the temperature in chamber of the refrigerating apparatus main body 105 and the cooling capability (refrigerating capability). A solid line shows the cooling capability in a case where the pressure is reduced in the first capillary tube 158, and a broken line shows the cooling capability in the reduction of the pressure in the second capillary tube 159. As shown in FIG. 7, the cooling capability remarkably changes at the temperature in chamber of the refrigerating apparatus main body 105 at +29° C. to +35° C. That is, in a temperature zone of the temperature in chamber which is lower than +29° C., the cooling capability is high. The cooling capability rapidly decreases in the vicinity at +29° C., and the decrease of the cooling capability is not small at +35° C. or more.

Moreover, when the pressure is reduced in the first capillary tube 158 large in the flow path resistance, the refrigerant evaporates in a lower temperature range in the evaporator 92 (evaporation temperature is −8° C.), but the cooling capability is low as compared with the reduction of the pressure in the second capillary tube 159 small in flow path resistance.

Even when the temperature in chamber of the refrigerating apparatus main body 105 is not less than +32° C., the pressure of the refrigerant is reduced in the first capillary tube 158 large in flow path resistance as described above, and the rotation number of the compressor 10 then needs to be raised to increase the refrigerant circulating amount of the refrigerant circuit and to increase the amount of the refrigerant flowing into the evaporator 92 so that the desired cooling capability is obtained. The power consumption increases. Although the refrigerant on the high-pressure side does not easily flow, more refrigerant is compressed by the compressor 10. Therefore, the pressure on the high-pressure side rises and exceeds the designed pressure of the apparatus. In the worst case, there is a possibility that the problem of the damage on the apparatus is caused.

Therefore, when the temperature in chamber is +32° C. or more, the microcomputer 80 opens the valve device 163 to open the flow path of the refrigerant piping 161 so that the pressure of the refrigerant is reduced in the second capillary tube 159 small in flow path resistance. Moreover, the rotation number of the compressor 10 is controlled so as to operate the compressor in a range of 50 to 60 Hz, and the refrigerant circulating amount of the refrigerant circuit increases. Accordingly, the amount of refrigerant flowing into the evaporator 92 increases, and the cooling capability in the evaporator 92 is enhanced.

On the other hand, when the temperature in chamber is lower than +32° C., the microcomputer 80 opens the valve device 162 to open the flow path of the refrigerant piping 160 so that the pressure of the refrigerant is reduced in the first capillary tube 158 large in flow path resistance. Moreover, the rotation number of the compressor 10 is controlled so as to operate the compressor in a range of 30 to 50 Hz. Accordingly, since the refrigerant evaporators in the lower temperature region in the evaporator 92, the inside of the chamber of the refrigerating apparatus main body 105 can be set at the desired temperature (−2° C. to +7° C.). That is, when the pressure of the refrigerant is reduced in the second capillary tube 159 small in the flow path resistance, the evaporation temperature of the refrigerant in the evaporator 92 is high at 0° C., and it is difficult to cool the temperature in chamber of the refrigerating apparatus main body 105 in the vicinity at 0° C. at the evaporation temperature. Moreover, the rotation number of the compressor 10 needs to be raised to remarkably increase the amount of refrigerant flowing into the evaporator 92 so that the desired temperature is obtained, and this results in the increase of the power consumption.

However, as described above, at the temperature in chamber lower than +32° C., the pressure of the refrigerant is reduced in the first capillary tube 158 large in flow path resistance, and accordingly the refrigerant evaporates at −8° C. in the evaporator 92 as shown in FIG. 7. Therefore, the temperature in chamber of the refrigerating apparatus main body 105 can be set in a range of −2° C. to +7° C. without raising the rotation number of the compressor 10 to increase the amount of refrigerant flowing into the evaporator 92.

At this time, as shown in FIG. 7, the cooling capability drops as compared with the reduction of the pressure in the second capillary tube 159, but the cooling capability is high in the temperature zone as described above, and therefore there is not any problem.

Moreover, when the pressure is reduced in the first capillary tube 158 large in flow path resistance, and the rotation number of the compressor 10 is controlled so as to operate the compressor in a comparatively high rotation number of 50 to 60 Hz, the refrigerant on the high-pressure side does not easily flow, but more refrigerant is compressed by the compressor 10. Therefore, the refrigerant on the high-pressure side abnormally rises and exceeds the designed pressure of the pressure, and in the worst case, there is a possibility that the problem of the damage on the apparatus is caused.

Therefore, the microcomputer 80 controls the rotation number of the compressor 10 in such a manner that the rotation number lowers and the compressor operates in a range of 30 to 50 Hz, the above-described abnormal rise of the refrigerant on the high-pressure side can be prevented, and the damage on the apparatus can be avoided in advance. Since the rotation number is lowered, the power consumption can further be reduced.

On the other hand, when the temperature in chamber of the refrigerating apparatus main body 105 detected by the temperature sensor in chamber 91 is +32° C. or more, the control device 90 sends the predetermined signal to the microcomputer 80, and the microcomputer 80 closes the valve device 162 and opens the valve device 163 to open the flow path of the refrigerant piping 161. Furthermore, the microcomputer 80 controls the rotation number of the compressor 10 in such a manner that the rotation number rises and the compressor 10 operates in a range of 50 to 60 Hz.

Accordingly, since the amount of refrigerant circulating in the refrigerant cycle as described above, more refrigerant flows into the evaporator 92, therefore the cooling capability in the evaporator 92 is enhanced, and the temperature in chamber of the refrigerating apparatus main body 105 can be lowered in the early stages.

Moreover, the refrigerant flows out of the evaporator 92, and reaches the internal heat exchanger 50 of the condensing unit 100 via the swage lock joint (not shown) connecting the other end of the refrigerant piping 94 to the refrigerant piping 28 of the condensing unit 100. Then, the refrigerant takes the heat from the refrigerant on the high-pressure side to undergo the heating function. Here, the refrigerant evaporates at the low temperature in the evaporator 92. The refrigerant discharged from the evaporator 92 is not completely brought into the gas state, and the liquid mixed state is attained in some case. However, the refrigerant is passed through the internal heat exchanger 50 to exchange the heat with the high-temperature refrigerant on the high-pressure side, and is accordingly heated. At this time, the refrigerant secures the degree of superheat, and completely turns to the gas.

Accordingly, since the refrigerant discharged from the evaporator 92 can securely be gasified, the liquid return is securely prevented to prevent the liquid refrigerant from being sucked into the compressor 10 without disposing any accumulator on the low-pressure side, and it is possible to avoid the inconvenience that the compressor 10 is damaged by the liquid compression. Therefore, the reliability of the refrigerant cycle apparatus 110 can be enhanced.

It is to be noted that the cycle is repeated in which the refrigerant heated in the internal heat exchanger 50 is sucked into the first rotary compression element of the compressor 10 from the refrigerant introducing tube 22 via the strainer 56.

In this manner, when the temperature in chamber of the refrigerating apparatus main body 105 detected by the temperature sensor in chamber 91 is +32° C. or more, the pressure of the refrigerant from the strainer 54 is reduced in the second capillary tube 159 smaller in flow path resistance. Moreover, the rotation number of the compressor 10 is raised and controlled so as to operate the compressor 10 in a range of 50 to 60 Hz, and the refrigerant circulating amount in the refrigerant circuit increases. Accordingly, since the amount of refrigerant flowing in the evaporator 92 increases, the cooling capability (refrigerating capability) is enhanced, and the inside of the chamber of the refrigerating apparatus main body 105 can be cooled in the early stages.

On the other hand, when the temperature in chamber of the refrigerating apparatus main body 105 is lower than +32° C., the pressure is reduced in the first capillary tube 158 large in flow path resistance. Moreover, the rotation number of the compressor 10 is lowered and controlled so as to operate the compressor 10 in a range of 30 to 50 Hz, and the abnormal rise of the pressure on the high-pressure side can be avoided. Since the refrigerant evaporates in the lower temperature region in the evaporator 92, the temperature in chamber can be cooled at the predetermined low temperature (−2° C. to +7° C.). Furthermore, when the rotation number of the compressor 10 is lowered to operate the compressor, the power consumption can be reduced.

In general, when the temperature in chamber of the refrigerating apparatus main body 105 is set in a range of −2° C. to +7° C., and the above-described control is executed, the capability of the refrigerant cycle apparatus 110 is enhanced, an optimum flow path resistance can easily be selected, and therefore the throttling mechanism 120 can be simplified. Since an optimum rotation number of the compressor can easily be selected, the rotation number control of the compressor 10 can be simplified, and the production cost of the refrigerant cycle apparatus 110 can be reduced.

Moreover, when the throttling mechanism 120 is constituted of the inexpensive capillary tubes 158, 159 as in the embodiment, the production cost can further be reduced.

Accordingly, while avoiding the unstable operation situation of the compressor 10 with a simple control mechanism, the reduction of the production cost and the enhancement of the capability can be realized with respect to the refrigerant cycle apparatus 110.

It is to be noted that in the refrigerant cycle apparatus of the present embodiment, the valve devices 162, 163 are opened/closed and the rotation number of the compressor 10 is controlled based on the temperature of the space to be cooled by the evaporator 92, which is the output of the temperature sensor in chamber 91 for detecting the temperature in chamber of the refrigerating apparatus main body 105. However, the present invention is not limited to this, and the control may also be performed, for example, based on the output of the sensor for detecting the temperature of the refrigerant discharged from the internal heat exchanger 50 via the evaporator 92.

In the present embodiment, when the temperature in chamber detected by the temperature sensor in chamber 91 is +32° C. or more, the pressure of the refrigerant is reduced in the second capillary tube 159 small in flow path resistance, and the rotation number of the compressor 10 is raised. When the temperature is lower than +32° C., the pressure of the refrigerant is reduced in the first capillary tube 158 large in flow path resistance, and the rotation number of the compressor 10 is lowered. However, the temperature at which the flow path resistance and the rotation number are variable is not limited to this, and the temperature may be any of +29° C. to +35° C.

Moreover, the throttling means is constituted of the capillary tubes 158, 159 in the embodiment, but the throttling means of the present invention is not limited to this, and the electrical or mechanical expansion valve whose opening is adjustable may also be used. Even with the use of the expansion valve, the above-described control can be performed to simplify the control of the expansion valve.

Moreover, the valve devices for the flow path control are disposed both in the refrigerant piping 160 including the first capillary tube 158 and the refrigerant piping 161 including the second capillary tube 159 in the embodiment. However, as shown in FIG. 3, the valve device may be disposed only in the refrigerant piping 161 in which the second capillary tube 159 small in flow path resistance is disposed. In this case, at the temperature in chamber at +32° C. or more, the valve device 163 is opened to open the flow path of the refrigerant piping 161, and accordingly the refrigerant from the strainer 54 flows into the refrigerant piping 161 small in resistance. Therefore, in addition to the effect of the embodiment, when the valve device 163 is simply disposed, the flow path resistance can be reduced, and the production cost can further be reduced.

Moreover, in the present embodiment, the first capillary tube 158 and the second capillary tube 159 are disposed in the refrigerant piping 160 and the refrigerant piping 161, respectively, these tubes are connected in parallel, and the flow path is controlled by the valve devices 162, 163. However, the present invention is not limited to this. Three or more capillary tubes may also be disposed to allow the refrigerant to flow into each capillary tube in accordance with the operation situation as shown in FIG. 6. In this case, finer control can be executed.

Alternatively, two or more capillary tubes may be connected in series. In this case, the bypass piping is disposed via which one or more capillary tubes among the tubes are bypassed, the valve device is disposed in the bypass piping, and some of the tubes may also be bypassed in accordance with the operation situation.

As described above in detail, the refrigerant cycle apparatus of the present invention in this case includes the control device for controlling the flow path resistance of the throttling means and the rotation number of the compressor. When the temperature detected by the sensor is not less than the defined temperature that is any temperature of +29° C. to +35° C., the control device reduces the flow path resistance of the throttling means, and raises the rotation number of the compressor based on the output of the sensor for detecting the temperature of the space to be cooled by the evaporator. Moreover, when the temperature detected by the sensor is lower than the defined temperature, the flow path resistance of the throttling means is increased, and the rotation number of the compressor is lowered. Therefore, the flow path resistance and the rotation number of the compressor can be controlled based on the temperature detected by the sensor.

Moreover, the refrigerant cycle apparatus of the present invention includes the control device for controlling the flow path resistance of the throttling means and the rotation number of the compressor, and the internal heat exchanger for exchanging the heat between the refrigerant from the gas cooler and the refrigerant from the evaporator. Based on the output of the sensor for detecting the refrigerant temperature from the internal heat exchanger via the evaporator, the control device reduces the flow path resistance of the throttling means and raises the rotation number of the compressor, when the temperature detected by the sensor is not less than the defined temperature that is any temperature of +29° C. to +35° C. Moreover, when the temperature detected by the sensor is lower than the defined temperature, the flow path resistance of the throttling means is increased, and the rotation number of the compressor is lowered. Therefore, the flow path resistance and the rotation number of the compressor can be controlled based on the temperature detected by the sensor.

Accordingly, by the present invention, the disadvantage that the pressure on the high-pressure side abnormally rises is avoided in advance, the durability is enhanced, and the smooth operation can be secured with respect to the refrigerant cycle apparatus.

Moreover, when the temperature detected by the sensor is not less than the defined temperature, the flow path resistance of the throttling means is decreased to raise the rotation number of the compressor, and accordingly the refrigerant circulating amount in the refrigerant circuit increases. Therefore, since the amount of refrigerant flowing into the evaporator increases, the cooling capability (refrigerating capability) is enhanced. Therefore, the space to be cooled can be cooled in the early stages.

On the other hand, when the temperature detected by the sensor is lower than the predetermined value, the flow path resistance of the throttling means is increased to lower the rotation number of the compressor, and therefore the abnormal rise of the pressure on the high-pressure side can be avoided. Since the refrigerant evaporates in the lower temperature region in the evaporator, the space to be cooled can be cooled at the predetermined low temperature.

Accordingly, the capability of the refrigerant cycle apparatus can be enhanced. Furthermore, when the rotation number of the compressor is lowered, the power consumption can be reduced.

Moreover, in the respective inventions, when the temperature of the space to be cooled by the evaporator is set in a range of −2° C. to +7° C., the optimum control can be executed.

In general, when the temperature in chamber of the refrigerating apparatus main body is set in a range of −2° C. to +7° C., and the above-described control is executed, the capability of the refrigerant cycle apparatus is accordingly enhanced, the optimum flow path resistance can easily be selected, and therefore the throttling mechanism can be simplified. Since the optimum rotation number of the compressor can easily be selected, the rotation number control of the compressor can also be simplified.

Moreover, the throttling means is constituted of the first capillary tube, and the second capillary tube which is connected in parallel to the first capillary tube and whose flow path resistance is smaller than that of the first capillary tube, and the control device is connected to the valve device for controlling the refrigerant circulation into each capillary tube. The control device controls the valve device so as to pass the refrigerant into the second capillary tube, when the temperature detected by the sensor is not less than the defined temperature, and to pass the refrigerant into the first capillary tube, when the temperature is lower than the defined temperature. Then, the flow path resistance can be variable using the inexpensive capillary tubes, and the production cost can be reduced.

Especially, when the valve device for controlling the refrigerant circulation into the second capillary tube is simply disposed, the flow path resistance can be variable, and therefore the production cost can further be reduced.

Furthermore, the present invention is suitable for the apparatus using carbon dioxide whose pressure on the high-pressure side is supercritical as the refrigerant. Moreover, when the carbon dioxide refrigerant is used as the refrigerant, the present invention is also capable of contributing to the environmental problems.

Especially, when the compressor includes the first and second compression elements driven by the driving element, the refrigerant is sucked into the first compression element from the low-pressure side of the refrigerant circuit and compressed, and the refrigerant discharged from the first compression element and having the intermediate pressure is sucked into the second compression element, compressed, and discharged to the gas cooler, the abnormal rise of the pressure on the high-pressure side can effectively be eliminated.

Next, still another invention will be described. It is to be noted that in this case, the refrigerant circuit of the refrigerant cycle apparatus is similar to that of FIGS. 1 to 3.

Furthermore, in this case, when the temperature in chamber of the refrigerating apparatus main body 105 detected by the temperature sensor in chamber is not more than the set value, the control device 90 sends the predetermined signal to the microcomputer 80. Accordingly, the microcomputer 80 closes the valve device 162 and opens the valve device 163 to open the flow path of the refrigerant piping 161. The refrigerant from the strainer 54 then flows into the second capillary tube 159.

Next, the operation of the refrigerant cycle apparatus 110 in this case will be described. It is to be noted that in this case the microcomputer 80 operates the electric element of the compressor 10 at a constant speed, and capacity control means such as the inverter are not used. That is, the start switch (not shown) disposed in the refrigerating apparatus main body 105 is turned on, or the power socket of the refrigerating apparatus main body 105 is connected to the electrical outlet. Then, the microcomputer 80 opens the valve device 162, closes the valve device 163, and opens the flow path of the refrigerant piping 160 to start the electric element of the compressor 10. Accordingly, the refrigerant is sucked into the first rotary compression element of the compressor 10 and compressed, and the refrigerant gas discharged into the sealed container enters the refrigerant introducing tube 20 and flows into the intermediate cooling circuit 35 from the compressor 10. Moreover, in the intermediate cooling circuit 35, the heat is released from the refrigerant passed through the gas cooler 40 by the air cooling method.

Accordingly, since the refrigerant sucked into the second rotary compression element can be cooled, the temperature rise in the sealed container is suppressed, and the compression efficiency in the second rotary compression element can be enhanced. It is also possible to suppress the temperature rise of the refrigerant which has been compressed by the second rotary compression element and discharged.

Moreover, the cooled refrigerant gas having the intermediate pressure is sucked into the second rotary compression element of the compressor 10, and compressed in the second stage to constitute the refrigerant gas having the high pressure at the high temperature, and the gas is discharged to the outside via the refrigerant discharge tube 24. The refrigerant gas discharged from the refrigerant discharge tube 24 flows into the gas cooler 40, the heat is released by the air cooling method, and thereafter the gas passes the internal heat exchanger 50. The heat of the refrigerant is taken by the refrigerant on the low-pressure side, and is further cooled.

Since the heat of the refrigerant passed through the internal heat exchanger 50 from the gas cooler 40 is taken by the refrigerant on the low-pressure side by the presence of the internal heat exchanger 50, the supercooling degree of the refrigerant increases. Therefore, the cooling capability in the evaporator 92 is improved.

The refrigerant gas on the high-pressure side cooled by the internal heat exchanger 50 flows into the refrigerant piping 160 via the strainer 54 and valve device 162, and reaches the capillary tube 158. The pressure of the refrigerant drops in the capillary tube 158, and the refrigerant flows into the evaporator 92 from the refrigerant piping 94 of the refrigerating apparatus main body 105 via the swage lock joint (not shown) connecting the refrigerant piping 26 to one end of the refrigerant piping 94 of the refrigerating apparatus main body 105. Here, the refrigerant evaporates, takes the heat from the surrounding air to fulfill the cooling function, and cools the inside of the chamber of the refrigerating apparatus main body 105.

Here, as described above, at the starting time the microcomputer 80 opens the flow path of the refrigerant piping 160, and therefore the refrigerant from the strainer 54 flows into the first capillary tube 158 having a flow path resistance larger than that of the second capillary tube 159. At the starting time, the liquid refrigerant pooled in the evaporator 92 is sucked into the compressor 10, and this liquid return easily occurs. When the pressure is reduced in the second capillary tube 159 small in flow path resistance, the refrigerant on the high-pressure side compressed by the compressor 10 easily flows, the amount of refrigerant sucked into the compressor 10 accordingly increases, and there is a possibility that the compressor 10 compresses liquid and is damaged.

However, when the pressure of the refrigerant is reduced in the first capillary tube 158, the refrigerant circulating amount in the refrigerant circuit decreases as compared with the reduction of the pressure in the second capillary tube 159. That is, the amount of the refrigerant sucked into the compressor 10 decreases. Therefore, it is possible to avoid the disadvantage that the liquid refrigerant pooled in the evaporator 92 rapidly returns to the compressor 10, and the damage on the compressor 10 can be avoided in advance.

Accordingly, since the stable operation is possible at the starting time of the compressor 10, the reliability of the refrigerant cycle apparatus can be enhanced.

Moreover, the refrigerant flows out of the evaporator 92, and reaches the internal heat exchanger 50 of the condensing unit 100 via the swage lock joint (not shown) connecting the other end of the refrigerant piping 94 to the refrigerant piping 28 of the condensing unit 100. Then, the refrigerant takes the heat from the refrigerant on the high-pressure side, and undergoes the heating function. Here, the refrigerant evaporates in the evaporator 92 at the low temperature. The refrigerant discharged from the evaporator 92 is not completely brought into the gas state, and the liquid mixed state is attained in some case. However, the refrigerant is passed through the internal heat exchanger 50 to exchange the heat with the high-temperature refrigerant on the high-pressure side, and is accordingly heated. At this time, the refrigerant secures the degree of superheat, and completely turns to the gas.

As described above, the refrigerant from the gas cooler 40 is passed through the first capillary tube 158 large in flow path resistance at the starting time, and the refrigerant circulating amount in the refrigerant circuit is decreased. By the effect that the liquid refrigerant pooled in the evaporator 92 is prevented from rapidly returning to the compressor 10 and the effect that the liquid refrigerant is heated in the internal heat exchanger 50, the refrigerant discharged from the evaporator 92 can securely be gasified. Therefore, the liquid return is securely prevented to prevent the liquid refrigerant from being sucked into the compressor 10 without disposing any accumulator on the low-pressure side, and it is possible to avoid the inconvenience that the compressor 10 is damaged by the liquid compression. Therefore, the reliability of the refrigerant cycle apparatus 110 can be enhanced.

It is to be noted that the cycle is repeated in which the refrigerant heated in the internal heat exchanger 50 is sucked into the first rotary compression element of the compressor 10 from the refrigerant introducing tube 22 via the strainer 56.

Here, when the temperature in chamber of the refrigerating apparatus main body 105 drops below the set value, the control device 90 of the refrigerating apparatus main body 105 converts the output from the temperature sensor in chamber into the predetermined communication signal, and sends the signal to the microcomputer 80. Upon receiving the signal, the microcomputer 80 closes the valve device 162, opens the valve device 163, and opens the flow path of the refrigerant piping 161. Accordingly, the refrigerant from the strainer 54 flows into the refrigerant piping 161, and the pressure of the refrigerant is reduced in the second capillary tube 159.

That is, when the refrigerant circulates to a certain degree after the starting of the compressor 10, the liquid refrigerant pooled in the evaporator 92 is eliminated, the states of the apparatus and refrigerant in the refrigerant circuit are stabilized, and the temperature in chamber of the refrigerating apparatus main body 105 drops. Then, when the temperature in chamber of the refrigerating apparatus main body 105 drops below the set value, the control device 90 sends the predetermined signal to the microcomputer 80. The microcomputer 80 which has received the signal closes the valve device 162, opens the valve device 163, and opens the flow path of the refrigerant piping 161 so as to reduce the pressure of the refrigerant in the second capillary tube 159 small in flow path resistance. Accordingly, the pressure of the refrigerant from the strainer 54 is reduced in the second capillary tube 159.

Accordingly, when the pressure is reduced in the second capillary tube 159 small in flow path resistance, the refrigerant circulating amount increases, and the cooling capability (refrigerating capability) in the evaporator 92 of the refrigerating apparatus main body 105 is enhanced.

When the temperature in chamber of the refrigerating apparatus main body 105 is higher than the set value in this manner, the pressure of the refrigerant from the strainer 54 is reduced in the first capillary tube 158 large in flow path resistance, and accordingly the refrigerant circulating amount in the refrigerant circuit can be reduced.

Accordingly, since it is possible to avoid the disadvantage that the liquid refrigerant pooled in the evaporator 92 rapidly returns into the compressor 10, the durability of the compressor 10 can be enhanced.

Furthermore, when the temperature in chamber of the refrigerating apparatus main body 105 drops to be not more than the set value, the refrigerant having the pressure reduced in the second capillary tube 159 small in flow path resistance flows into the evaporator 92, the amount of refrigerant flowing into the evaporator 92 increases, and the cooling capability (refrigerating capability) is accordingly enhanced.

Furthermore, without controlling the rotation number of the compressor by the inverter (capacity control) or adjusting the opening of the expansion valve as in the related art, the liquid return into the compressor 10 can be prevented only by the valve devices 162, 163 for controlling the opening/closing of the capillary tubes 158, 159, and the production cost can be reduced.

It is to be noted that in the refrigerant cycle apparatus of the present embodiment, the valve devices 162, 163 are opened/closed based on the temperature in chamber of the refrigerating apparatus main body 105 detected by the temperature sensor in chamber connected to the control device 90 of the refrigerating apparatus main body 105. However, the present invention is not limited to this, and the microcomputer 80 may also control the valve devices 162, 163 based on the refrigerant temperature detected by the discharge temperature sensor 70 connected to the microcomputer 80 of the condensing unit 100.

Furthermore, the present invention is effective in that the valve device 162 is closed and the valve device 163 is opened with the elapse of the predetermined time after the starting of the compressor 10 regardless of the refrigerant temperature in the refrigerant circuit.

Moreover, the valve devices for the flow path control are disposed both in the refrigerant piping 160 including the first capillary tube 158 and the refrigerant piping 161 including the second capillary tube 159. However, as shown in FIG. 3, the valve device may be disposed only in the refrigerant piping 161 in which the second capillary tube 159 small in flow path resistance is disposed. In this case, when the compressor 10 is started, and the temperature in chamber of the refrigerating apparatus main body 105 drops to the predetermined value, the valve device 163 is opened to open the flow path of the refrigerant piping 161, and accordingly the refrigerant from the strainer 54 flows into the refrigerant piping 161 small in resistance. Therefore, in addition to the effect of the embodiment, when the valve device 163 is simply disposed, the flow path resistance can be varied, and the production cost can further be reduced.

Moreover, in the present embodiment, the first capillary tube 158 and the second capillary tube 159 are disposed in the refrigerant piping 160 and the refrigerant piping 161, respectively, these tubes are connected in parallel, and the flow path is controlled by the valve devices 162, 163. However, the present invention is not limited to this. Three or more capillary tubes may also be disposed to allow the refrigerant to flow into each capillary tube in accordance with the operation situation in some case. Alternatively, two or more capillary tubes may be connected in series. In this case, the bypass piping is disposed via which one or more capillary tubes among the tubes are bypassed, the valve device is disposed in the bypass piping, and some of the tubes may also be bypassed in accordance with the operation situation.

Furthermore, the compressor 10 is operated at a constant speed in the present embodiment, but the present invention may also be applied to the rotation number control of the compressor by the inverter. In this case, since the rotation number control at the starting time can be facilitated, the control function can be simplified.

As described above in detail, in the refrigerant cycle apparatus of the present invention in this case, the throttling means is constituted of a plurality of capillary tubes. Moreover, the refrigerant circulation into each capillary tube is controlled so that the flow path resistance of the throttling means is variable. The flow path resistance of the throttling means at the starting time of the compressor is increased. For example, the throttling means is constituted of the first capillary tube, and the second capillary tube connected in parallel to the first capillary tube and having a flow path resistance smaller than that of the first capillary tube, the valve device is disposed to control the refrigerant circulation into each capillary tube, and the refrigerant is allowed to flow into the first capillary tube at the starting time of the compressor. Then, the flow path resistance at the starting time can be increased.

Accordingly, the disadvantage that the liquid refrigerant pooled in the evaporator returns to the compressor at the starting time is avoided in advance, the durability is enhanced, and the smooth operation can be secured.

Moreover, when the flow path resistance is reduced at the normal operation time other than the starting time, the amount of refrigerant flowing into the evaporator increases, and the capability of the refrigerant cycle apparatus can be enhanced.

Furthermore, without controlling the rotation number of the compressor by the inverter (capacity control) or adjusting the opening of the expansion valve as in the related art, the disadvantage of the liquid refrigerant sucked into the compressor can be avoided only by a plurality of inexpensive capillary tubes, and the production cost can be reduced.

Especially, when the valve device for controlling the refrigerant circulation into the second capillary tube is simply disposed, the flow path resistance at the starting time is variable, and the production cost can be reduced.

Furthermore, the present invention is suitable for the apparatus using carbon dioxide which brings the pressure on the high-pressure side into the supercritical state as the refrigerant. Moreover, when the carbon dioxide refrigerant is used as the refrigerant, the present invention can also contribute to the environmental problems.

Especially, when the compressor includes the first and second compression elements driven by the driving element, the refrigerant is sucked into the first compression element from the low-pressure side of the refrigerant circuit and compressed, and the refrigerant discharged from the first compression element and having the intermediate pressure is sucked into the second compression element, compressed, and discharged to the gas cooler, the liquid return indicating that the liquid refrigerant is sucked into the compressor at the starting time can effectively be eliminated.

It is to be noted that in the above-described embodiments, the internal intermediate pressure type multistage (two stages) compressive rotary compressor has been used as the compressor, but the compressor usable in the present invention is not limited to this, and various compressors such as a single stage compressor and a scroll type compressor can be applied.

What is claimed is:

1. A refrigerant cycle apparatus comprising: a refrigerant circuit constituted by successively connecting a compressor, a gas cooler, throttling means, and an evaporator, wherein the throttling means includes a plurality of capillary tubes, refrigerant circulation into each capillary tube is controlled so that a flow path resistance of the throttling means is variable, and the flow path resistance of the throttling means at the time of the starting of the compressor is reduced;

wherein carbon dioxide is used as the refrigerant, the compressor includes first and second compression elements driven by a driving element, the refrigerant is sucked into the first compression element from the low-pressure side of the refrigerant circuit and compressed, and the refrigerant discharged from the first compression element and having an intermediate pressure is sucked into the second compression element, compressed, and discharged to the gas cooler, wherein an intermediate cooling circuit is used to cool the refrigerant discharged from the first compression element before the refrigerant is sucked into the second compression element, and wherein an internal heat exchanger is used to exchange heat from the refrigerant on the high pressure side flowing from the gas cooler to the refrigerant on the low pressure side flowing from the evaporator.

2. The refrigerant cycle apparatus according to claim 1, wherein the throttling means comprises: a first capillary tube: and a second capillary tube which is connected in parallel to the first capillary tube and whose flow path resistance is smaller than that of the first capillary tube, a valve device for controlling the refrigerant circulation into each capillary tube is disposed, and the refrigerant is passed into the second capillary tube at the starting time of the compressor.

3. The refrigerant cycle apparatus according to claim 1, wherein the throttling means comprises: a first capillary tube: and a second capillary tube which is connected in parallel to the first capillary tube and whose flow path resistance is smaller than that of the first capillary tube, a valve device for controlling the refrigerant circulation into the second capillary tube is disposed, and the refrigerant is passed into the second capillary tube at the starting time of the compressor.

4. The refrigerant cycle apparatus according to claim 1, 2, or 3, wherein the flow path resistance of the throttling means is reduced or the refrigerant is passed into the second capillary tube for a predetermined time from the starting of the compressor.

5. The refrigerant cycle apparatus according to claim 1, 2, or 3, wherein the flow path resistance of the throttling means is reduced or the refrigerant is passed into the second capillary tube from when the compressor is started until a temperature of a refrigerant in the refrigerant circuit reaches a predetermined value.

6. The refrigerant cycle apparatus according to claim 1, 2, or 3, wherein the flow path resistance of the throttling means is reduced or the refrigerant is passed into the second capillary tube from when the compressor is started until a temperature of a space to be cooled by the evaporator drops to a predetermined value.

* * * * *